US011921870B2

(12) United States Patent
Paterra et al.

(10) Patent No.: US 11,921,870 B2
(45) Date of Patent: *Mar. 5, 2024

(54) PROVISIONING OF A SHIPPABLE STORAGE DEVICE AND INGESTING DATA FROM THE SHIPPABLE STORAGE DEVICE

(71) Applicant: Amazon Technologies, Inc., Seattle, WA (US)

(72) Inventors: Frank Paterra, Kirkland, WA (US); Firat Basarir, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/058,720

(22) Filed: Nov. 23, 2022

(65) Prior Publication Data
US 2023/0161889 A1 May 25, 2023

Related U.S. Application Data

(60) Continuation of application No. 17/187,472, filed on Feb. 26, 2021, now Pat. No. 11,514,175, which is a (Continued)

(51) Int. Cl.
*G06F 21/60* (2013.01)
*G06F 21/44* (2013.01)
(Continued)

(52) U.S. Cl.
CPC ............ *G06F 21/606* (2013.01); *G06F 21/44* (2013.01); *G06F 21/80* (2013.01); *G06Q 10/00* (2013.01);
(Continued)

(58) Field of Classification Search
CPC ........ G06F 21/44; G06F 21/606; G06F 21/80; H04L 9/0822; H04L 9/0897; H04L 9/3263; H04L 63/0428
See application file for complete search history.

(56) References Cited

U.S. PATENT DOCUMENTS 6,490,601 B1    12/2002  Markus et al.
7,254,706 B2     8/2007  Gougeon et al.
(Continued)

FOREIGN PATENT DOCUMENTS

CN    101118586    2/2008
CN    101316274   12/2008
(Continued)

OTHER PUBLICATIONS

Office Action in Japanese Application No. 2020-022235, dated Apr. 20, 2021, Amazon Technologies, Inc. (Japanese and English versions), pp. 1-4.
(Continued)

*Primary Examiner* — Chau Le
(74) *Attorney, Agent, or Firm* — Robert C. Kowert; Kowert, Hood, Munyon, Rankin & Goetzel, P.C.

(57) ABSTRACT

When a client requests a data import job, a remote storage service provider provisions a shippable storage device that will be used to transfer client data from the client to the service provider for import. The service provider generates security information for the data import job, provisions the shippable storage device with the security information, and sends the shippable storage device to the client. The service provider also sends client-keys to the client, separate from the shippable storage device (e.g., via a network). The client receives the device, encrypts the client data and keys, transfers the encrypted data and keys onto the device, and ships it back to the service provider. The remote storage service provider authenticates the storage device, decrypts client-generated keys using the client-keys stored at the storage service provider, decrypts the data using the decrypted client-side generated keys, and imports the decrypted data.

20 Claims, 25 Drawing Sheets

Related U.S. Application Data continuation of application No. 16/530,891, filed on Aug. 2, 2019, now Pat. No. 10,936,735, which is a continuation of application No. 15/943,627, filed on Apr. 2, 2018, now Pat. No. 10,372,922, which is a division of application No. 14/975,363, filed on Dec. 18, 2015, now Pat. No. 9,934,389.

(51) Int. Cl.
| | | |
|---|---|---|
| *G06F 21/80* | (2013.01) | |
| *G06Q 10/00* | (2023.01) | |
| *G06Q 10/06* | (2023.01) | |
| *G06Q 10/0631* | (2023.01) | |
| *G06Q 10/08* | (2023.01) | |
| *G06Q 10/083* | (2023.01) | |
| *H04L 9/08* | (2006.01) | |
| *H04L 9/32* | (2006.01) | |
| *H04L 9/40* | (2022.01) | |

(52) U.S. Cl.
CPC ....... *G06Q 10/06* (2013.01); *G06Q 10/06314* (2013.01); *G06Q 10/08* (2013.01); *G06Q 10/083* (2013.01); *H04L 9/0822* (2013.01); *H04L 9/0897* (2013.01); *H04L 9/3263* (2013.01); *H04L 63/0428* (2013.01)

(56) References Cited

U.S. PATENT DOCUMENTS

| | | | |
|---|---|---|---|
| 7,302,469 B2 | 11/2007 | Motoyama et al. | |
| 7,681,104 B1 | 3/2010 | Sim-Tang et al. | |
| 8,225,109 B1 | 7/2012 | Kalligudd | |
| 8,312,557 B2 | 11/2012 | Steinberg | |
| 8,782,441 B1 | 7/2014 | Osterwalder et al. | |
| 8,798,784 B1 | 8/2014 | Clark et al. | |
| 9,037,192 B2 | 5/2015 | Klein et al. | |
| 9,141,679 B2 | 9/2015 | Gopalan et al. | |
| 9,158,927 B1 | 10/2015 | Franklin et al. | |
| 9,258,201 B2 | 2/2016 | McCoy et al. | |
| 9,270,683 B2* | 2/2016 | Coughlin | G06F 21/80 |
| 9,400,979 B2 | 7/2016 | Carrott | |
| 9,405,333 B1 | 8/2016 | Pine | |
| 9,544,140 B1* | 1/2017 | Bhatia | H04L 9/34 |
| 9,599,990 B2 | 3/2017 | Halloran et al. | |
| 9,887,998 B2 | 2/2018 | Paterra et al. | |
| 9,934,389 B2 | 4/2018 | Paterra et al. | |
| 10,360,529 B2 | 7/2019 | Lazier | |
| 10,366,062 B1 | 7/2019 | Lazier et al. | |
| 10,372,922 B2 | 8/2019 | Paterra et al. | |
| 10,482,413 B2 | 11/2019 | Paterra et al. | |
| 10,678,664 B1 | 6/2020 | Lazier et al. | |
| 10,936,735 B2 | 3/2021 | Paterra et al. | |
| 11,188,564 B1 | 11/2021 | Paterra | |
| 11,514,175 B2 | 11/2022 | Paterra et al. | |
| 2002/0067601 A1 | 6/2002 | Hsu et al. | |
| 2003/0055952 A1 | 3/2003 | Motoyama et al. | |
| 2004/0164149 A1* | 8/2004 | Roberts | G06Q 30/02 235/385 |
| 2005/0102522 A1 | 5/2005 | Kanda | |
| 2006/0004675 A1 | 1/2006 | Bennett et al. | |
| 2006/0064709 A1 | 3/2006 | Throckmorton et al. | |
| 2007/0124020 A1 | 5/2007 | Staples | |
| 2008/0189705 A1 | 8/2008 | Weinert et al. | |
| 2009/0196417 A1 | 8/2009 | Beaver et al. | |
| 2009/0319078 A1 | 12/2009 | Jackson | |
| 2010/0138764 A1 | 6/2010 | Hatambeiki et al. | |
| 2010/0306267 A1 | 12/2010 | Zamkoff et al. | |
| 2011/0082811 A1 | 4/2011 | Whitehouse | |
| 2011/0173460 A1 | 7/2011 | Ito et al. | |
| 2011/0225426 A1 | 9/2011 | Agarwal et al. | |
| 2011/0270762 A1* | 11/2011 | Lin | G06Q 20/18 705/64 |
| 2012/0151049 A1* | 6/2012 | Carlson | H04L 67/1042 709/224 |
| 2012/0166576 A1* | 6/2012 | Orsini | G06F 9/3863 709/217 |
| 2013/0019095 A1 | 1/2013 | Cohen et al. | |
| 2013/0275545 A1* | 10/2013 | Baptist | H04L 67/01 709/215 |
| 2013/0275744 A1* | 10/2013 | Resch | H04L 67/10 713/150 |
| 2013/0326583 A1 | 12/2013 | Freihold et al. | |
| 2014/0026209 A1* | 1/2014 | Asahara | G06F 21/608 726/16 |
| 2015/0156174 A1 | 6/2015 | Fahey et al. | |
| 2015/0175333 A1 | 6/2015 | Richardson et al. | |
| 2015/0310219 A1 | 10/2015 | Haager et al. | |
| 2015/0324745 A1 | 11/2015 | Goodall et al. | |
| 2015/0350316 A1 | 12/2015 | Calder et al. | |
| 2016/0077933 A1 | 3/2016 | Ventura et al. | |
| 2019/0354704 A1 | 11/2019 | Paterra et al. | |

FOREIGN PATENT DOCUMENTS

| | | |
|---|---|---|
| CN | 101478548 | 7/2009 |
| CN | 102360463 | 2/2012 |
| CN | 103026375 | 4/2013 |
| CN | 103179086 | 6/2013 |
| CN | 103384880 | 11/2013 |
| CN | 103595703 | 2/2014 |
| CN | 204331796 | 5/2015 |
| JP | 2004531923 | 10/2004 |
| JP | 2011172099 | 9/2011 |
| JP | 2017504856 | 2/2017 |
| KR | 1020130107383 | 10/2013 |
| WO | 02071382 | 9/2002 |
| WO | 2010041442 | 4/2010 |
| WO | 2015084890 | 6/2015 |

OTHER PUBLICATIONS

Office Action in Japanese Application No. 2020-022237, dated Apr. 20, 2021, Amazon Technologies, Inc. (Japanese and English versions), pp. 1-4.

International Search Report and Written Opinion from PCT/US2016/067147, dated Jun. 6, 2017, Amazon Technologies, Inc., pp. 1-12.

For Windows: "Windows 7 Bitlocker(TM) Security Policy Windows 7 Bitlocker(TM) Drive Encryptions Security Policy for FIPS 140-2 Validation," Aug. 31, 2011, XP055375244, Retrieved from the Internet: URL:http://csrc.nist.gov/groups/STM/cmvp/documents/140-1/140sp/140sp1332.pdf, pp. 9, paragraph 7—pp. 14.

"Chapter 13: Key management Techniques, Ed—Menezes A J; Van Oorschot P C; Vanstone S A," Handbook of Applied Cryptography; [CRC Press Series on Discrete Mathematices, and its Applications], CRC Press, Boca Raton, FL, US, pp. 543-590, Oct. 1, 1996, XP001525013 (pp. 551-553).

Qin-Long Huang, et al., "Design and implementationof a novel general format multimedia digital rights management system," Journal on Communications, Oct. 2013, pp. 153-161, vol. 34 No. 10.

Office Action dated Aug. 24, 2021 in Chinese Patent Application No. 201680073624.3, Amazon Technologies, Inc. (pp. 1-21 including translation).

Notification to Grant Patent Right for Invention dated Jul. 8, 2022 in Chinese Patent Application No. 201680073624.3, Amazon Technologies, Inc., pp. 1-6 (including translation).

Roger Menday, et al., "Investigating Access to Heterogeneous Storage Systems using Linked Data in Unicore Grid Middleware," 2009 International Conference on Information and Communication Technologies, IEEE, Sep. 25, 2009, pp. 46-51.

Liza Zyga weblo, "Light-up Cereal Boxes Powered by Shelvers on Display at CES," Jan. 11, 2011, Phys.org 2003-2015, Science X Network, downloaded from http://phys.org/news/201101lightupcerealpoweredshelvesces.html, pp. 1-13.

Anonymous, "How to turn an old netbook into a NAS Drive", dated Mar. 1, 2010, pp. 1-5.

(56) References Cited

OTHER PUBLICATIONS

Hermann Apfelbock, "Alte Gerate in NAS-Server Verwandeln-PC-WELT", dated Jun. 13, 2014, pp. 1-7.
Office Action from European Application No. 16739357.8-1222, (Amazon Technologies, Inc.), dated Jun. 11, 2018, pp. 1-8.
Office Action from Japanese Application No. 2017-566702, (English Translation and Japanese version), dated Mar. 5, 2019, pp. 1-8.
International Search Report and Written Opinion from PCT/US2016/040510, dated Aug. 25, 2016, Amazon Technologies, Inc., pp. 1-17.
Jeff Barr, "AWS Import/Export: Ship US That Disk! AWS Blog", Published May 21, 2009, Retrieved from URL: https://aws.amazon.com/blogs/aws/send-us-that-data/, pp. 1-6.
Anonymous, "Batch Cloud Data Transfer Services—Amazon Import/Export Snowball Applicance", Jun. 17, 2016, Retrieved from URL: https://web.archive.org/web/20160617044144/http://aws.amazon.com/importexport/, pp. 1-6.
Notice of Preliminary Rejection from Korean Application No. 10-2018-7000988, (English translation, Korean Version), pp. 1-22.
Office Action and Search Report from Chinese Application No. 201680038541, dated Feb. 2, 2021, pp. 1-12.

* cited by examiner

US 11,921,870 B2

PROVISIONING OF A SHIPPABLE STORAGE DEVICE AND INGESTING DATA FROM THE SHIPPABLE STORAGE DEVICE

This application is a continuation of U.S. patent application Ser. No. 17/187,472, filed Feb. 26, 2021, which is a continuation of U.S. patent application Ser. No. 16/530,891, filed Aug. 2, 2019, now U.S. Pat. No. 10,936,735, which is a continuation of U.S. patent application Ser. No. 15/943,627, filed Apr. 2, 2018, now U.S. Pat. No. 10,372,922, which is a divisional of U.S. patent application Ser. No. 14/975,363, filed Dec. 18, 2015, now U.S. Pat. No. 9,934,389, which are hereby incorporated by reference herein in their entirety.

BACKGROUND

Growth of data storage capacity for computer systems has far outpaced the growth in transmission speed for transferring data over networks between computer systems. The discrepancy is so great that transmitting a large amount of data from one storage facility to another storage facility can be prohibitively costly (e.g., requiring costly system upgrades) or lengthy (e.g., transmission taking several months or longer). Physically moving the storage media may leave the data on legacy hardware or may not be an available option (e.g., when the data is stored by a storage service on behalf of the customer). Some solutions have involved transferring the data to a portable storage device (e.g., network attached storage devices) and shipping the portable storage device to another storage facility where the data is transferred to another storage system.

For example, when a customer of a storage service provider wishes to move a large quantity of data from the customer's site to a location at the storage service provider, the customer may save the data onto a device and ship the device to the storage service provider. However, the confidentiality of the data may be compromised for various reasons. For example, during shipment, mistakes may occur that prevent a storage device from being shipped to the correct destination. Moreover, the device may be intercepted by a third party. Thus, a malicious third party may access confidential data on the device. In some cases, the device may arrive at the storage service provider without any indication that unauthorized access occurred.

Further, different customers may use different types of storage devices to transfer data to the storage service provider. New storage devices and techniques are constantly being developed and adopted by customers. Therefore, as the amount of data transferred from customers grows, it may become increasingly difficult for a storage service provider to transfer the data from multiple disparate storage devices in a secure and efficient manner.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement secure data transfer from one location to another location using a shippable storage device. Due to limited transmission speeds over networks, a large amount of data may be transferred from one location to another in a much shorter amount of time by using a shippable storage device instead of by using network transmission. Techniques for securing data stored on the shippable storage device may be implemented to ensure that the data will not be exposed to a third party if the shippable storage device is misplaced or intercepted during shipment from one location to another location.

Figure 1:
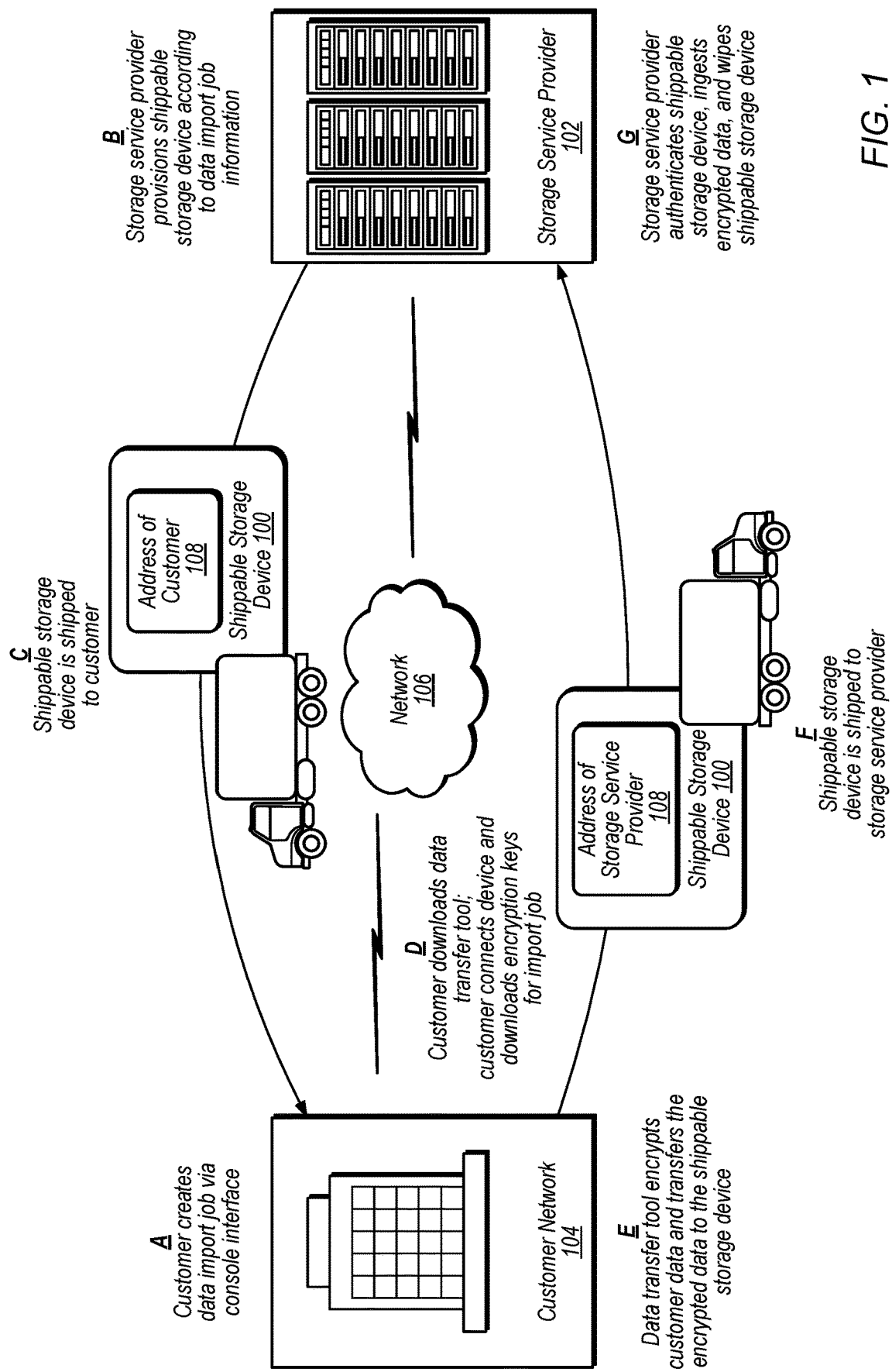
FIG. 1 illustrates a system and a process for securely transferring data using a shippable storage device, according to some embodiments.

FIG. 1 illustrates a system and a process for securely transferring data using a shippable storage device 100, according to some embodiments. The illustrated embodiment depicts movement of the shippable storage device 100 from a location of a storage service provider 102 to a location of a customer network 104 and back to the storage service provider 102 as well as various processes A-G that are performed along the way by various entities. The shippable storage device 100 depicted in FIG. 1 may be the same as the shippable storage device 100 depicted in FIGS. 2, 3, 5, 9, 11, and 22, in embodiments.

In some embodiments, a customer may have other location with networks and the shippable storage device 100 may be shipped to those locations instead of, in addition to, before, or after the depicted shipment C. In some embodiments, multiple different shippable storage devices may be shipped to various locations at the same time as the depicted shipment. Shippable storage devices 100 may be shipped to entities with networks other than customers, for example but not limited to, various other enterprises, government entities, other service providers or the like. Computers, such as a server or desktop computers at the location of the customer network 104 may perform some or all of the processes illustrated in FIGS. 4, 10, 12, 14-19, 21, and 18, in embodiments. Computers, such as a server or desktop computers at the location of the storage service provider 102 may perform some or all of the processes illustrated in FIGS. 4, 6-8, and 23-25, in embodiments.

In the depicted embodiment, (A) a customer creates, generates or requests that a data import job be performed. The data import job creation or request may be performed via a console interface such as a network-based page or site provided by the storage service provider 102 that the customer accesses via a computing device over one or more networks (e.g., network 106). At (B) the storage service provider 102 provisions a particular shippable storage device 100, instructs the shippable storage device 100 to display an address associated with the customer (e.g., obtained during job creation (A)) and ships the shippable storage device 100 to the requesting customer network 104 according to data import job information (e.g., job information may be determined during generation of the job at request time, in some embodiments).

At (C), a display 108 of the shippable storage device 100 is updated to display the address of the customer network 104 and the shippable storage device 100 is shipped to the location of the customer network 104. In some embodiments, the shippable storage device 100 does not have a display 108 or does not use the display 108. In such cases, an address may be written, stamped, or otherwise affixed onto the shippable storage device. In some embodiments, the shippable storage device 100 is shipped within an enclosure, which has the address visible on an outer portion of the enclosure.

At (D), the customer network 104 downloads a data transfer tool via the network 106 that is configured to encrypt customer data and store the encrypted data onto the shippable storage device 100. The customer network 104 also downloads a manifest for the data import job via the network 106, which may include encryption keys and other metadata associated with the data import job. In some embodiments, the data transfer tool downloads the manifest. At (E) the data transfer tool encrypts customer data and stores the encrypted customer data onto the shippable storage device 100. At (F), the display 108 of the shippable storage device 100 is updated with the address of the storage service provider 102 and the device is shipped back to the storage service provider 102. For example, the storage service provider 102 may send an updated address via the manifest, or the device may recognize it is at the customer location and automatically update the displayed destination address from a memory store programmed with the next destination during the provisioning step (B).

In some embodiments, the shippable storage device 100 may be sent to one or more other customer sites to have additional data stored on the shippable storage device 100 before being sent back to the storage service provider 102. At (G) the shippable storage device 100 is received back at the storage service provider 102 and connected to a network of the storage service provider 102. The storage service provider 102 may then verify that the shippable storage device 100 has not been tampered with. For example, the storage service provider 102 may verify that a configuration of the shippable storage device 100 has not been changed since the customer data was stored on the shippable storage device 100. The customer data is then ingested from the shippable storage device 100 into the storage service provider 102 system. The shippable storage device 100 is then wiped and stored until it is ready to be provisioned for another job.

In some embodiments, the shippable storage device 100 may be sent onto other customer locations or other customers distinct from the customer to store additional data before the shippable storage device 100 is sent back to the storage service provider 102. In some instances, the shippable storage device 100 may be used to distribute data from the storage service provider 102 to one or more different sites of the same customer, in embodiments. The shippable storage device 100 may be instructed to display various addresses at various times, such that the shippable storage device 100 is used to multi-cast data, for example in either the export or import embodiments. It is contemplated that the various addresses may be stored on the shippable storage device 100 at once, such as when the shippable storage device 100 is provisioned, for example, or the various addresses may be sent to the shippable storage device 100 over a network, such as a cellular network or via a customer or provider network or combination thereof. In embodiments, the shippable storage device 100 may include logic configured to update the displayed address based on the shippable storage device 100 sensing a geographical position or location of the shippable storage device 100. For instance, a shippable storage device 100 that determines (e.g., based on a GPS sensor or cellular triangulation) that it has arrived at one location, may be configured to display the next address stored in memory of the device.

Please note that previous descriptions are not intended to be limiting, but are merely provided as examples of securely transferring data using a shippable storage device. For instance, one or more steps may be removed and/or one or more steps may be added to securely transfer data using a shippable storage device. Moreover, in various embodiments, steps may be performed in different sequences.

This specification next includes a description of a shippable storage device that may be used for securely transferring data from one location to another, such as from a customer to a storage service provider (or vice versa). Then, an overview of the process of securely transferring data using a shippable storage device is provided. Next, a diagram illustrating a secure data transfer scheme is provided, including different components that may be employed as part of implementing the secure data transfer scheme. A number of different techniques to perform secure data transfer are then discussed, some of which are illustrated in accompanying diagrams and flowcharts. Finally, a description of an example computing system upon which the various components, modules, systems, devices, and/or nodes may be implemented is provided. Various examples are provided throughout the specification.

Figure 2:
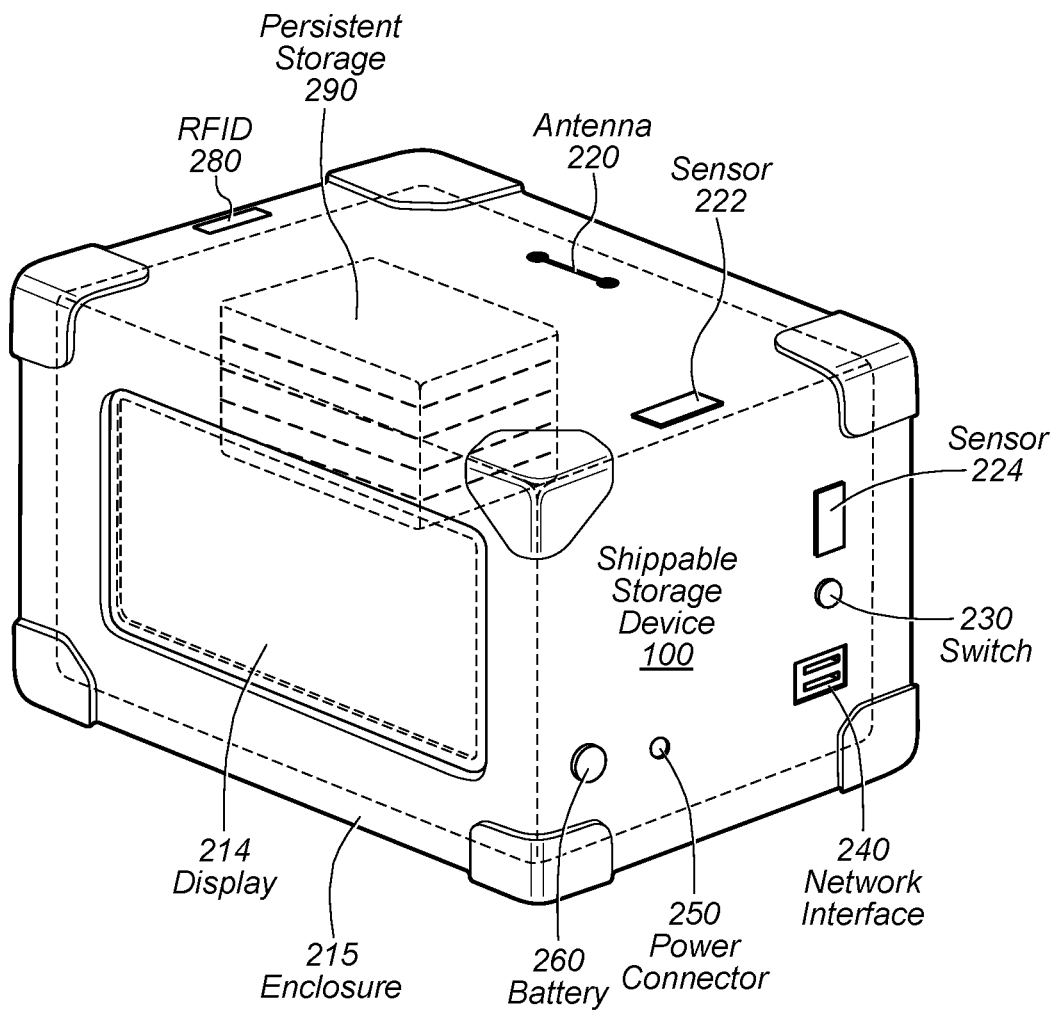
FIG. 2 illustrates a shippable storage device, according to some embodiments.

FIG. 2 illustrates a shippable storage device 100, according to some embodiments. The depicted shippable storage device 100 may be used to move large amounts of customer data off of customer storage networks or servers to other storage networks or servers, when other forms of transfer (e.g., broadband data transmission) are unavailable or cost or time prohibitive, for example. Embodiments of the shippable storage device 100 may include more, less, or different features or components than those depicted, in embodiments.

In the depicted embodiment, shippable storage device 100 includes an enclosure 215 surrounding persistent storage 290. The persistent storage may include any type of storage such as, but not limited to hard disk drives, optical media, magnetic tapes, memristor storage, persistent RAM or solid state storage devices. The enclosure may be ruggedized (e.g., according to various standards, such as military standards or electronics industry standards) and may be configured with an outward-facing electronic display 214 such that when enclosed by the enclosure, the persistent storage, the enclosure, and the electronic display form a self-contained shipping container suitable for shipping without any additional packaging, labeling or the like and such that the electronic display 214 acts as to display a destination location (e.g., in lieu of a shipping label). In embodiments, the enclosure 215 and the display 214 act as reusable shipping components in lieu of cardboard boxes and shipping labels. The enclosure may include various mechanisms to facilitate movement of the shippable storage device 100, such as rollers, handles or the like.

The shippable storage device 100 is illustrated with battery 260 and power connection 250 for powering some or all of the components of the shippable storage device 100 that require power to function. The power connection 250 may be configured to connect the shippable storage device 100 to an external power source, in embodiments. The power connector may power the persistent storage, in some embodiments. Other sources of power are contemplated, such as kinetic energy sources that rely upon the motion during shipping to power the shippable storage device 100, solar energy sources, or the like. Any of various power sources may power the electronics (e.g., the display or the storage) of the shippable storage device 100.

The shippable storage device 100 is depicted with display 214. The display 214 may incorporate any of various display technologies, such as low-power electronic-ink (E-ink), organic light emitting diodes (OLED), active-matrix organic light-emitting diode (AMOLED), flexible displays or touch-sensitive displays as non-limiting examples. Low-power e-ink displays may provide the benefit of reduced power consumption for a shipping environment where small batteries (e.g., batteries that cost less to ship, are less expensive or take up less shipping space) are preferred. The shippable storage device 100 may be configured with multiple displays 214, in some embodiments. For example, some carriers or fulfillment centers label three sides of a shipping container such that the destination of the container can be scanned or read irrespective of the orientation of the container. Similarly, multiple displays can be incorporated into multiple sides of the enclosure 215 of the device. For example, the enclosure may be configured with 1-6 or more displays, in some embodiments. The various displays maybe configured such that the displays are computer readable (e.g., via scanner).

The shippable storage device 100 is illustrated with network interface 240. The network interface 240 may act as interface between the shippable storage device 100 and various networks, such as LANS, WANS or the like (e.g., via various protocols, such as iSCSI or Ethernet). In some embodiments, network connection 240 may act as an interface directly to another device (e.g., via SCSI). In some instances, the network interface 240 may include two or more different types of interfaces (e.g., RJ45, SFP, optical).

The shippable storage device 100 is illustrated with switch 230. The switch 230 may act as an on-off power switch or as a switch to activate the display, in some embodiments. Device 100 is also illustrated with antenna 220. The antenna may be configured to facilitate wireless communication between the service provider or customer and the device. For example, the wireless communication may be over various cellular networks, Wi-Fi, or the like (e.g., network 106). For instance, the service provider may send updated address information to the shippable storage device 100 via cellular networks while the shippable storage device 100 is en route to some location. The updated address information may be displayed via the display 214 such that the shippable storage device 100 is rerouted on the fly, for example. In other embodiments, the wireless communication channel may be used to send updated shipping information for display while the device is located at the customer site. In embodiments, cellular networks may be used to track the device.

The shippable storage device 100 is illustrated with radio frequency identification (RFID) 280. The RFID may assist with tracking the device, in some instances. For example, devices may be identified during the provisioning process via a respective RFID or devices may be identified upon receipt at the customer or upon return to the service provider by a respective RFID. The RFID may be used to track the shippable storage device 100 as the device is routed through a facility, such as through a service providers fulfillment facility (e.g., while routed on a conveyor system).

The shippable storage device 100 is illustrated with various sensors 222, 224. The device may be outfitted with any of various sensors including a global positioning sensor (GPS), a temperature sensor, a humidity sensor or an accelerometer, all as non-limiting examples. Data may be collected from the sensors and used in various manners, such as to record the environment of the device (e.g., hot, cold, moderate, moist) or record various events associated with the shippable storage device 100, such as a drop, quick movement, orientation or location of the shippable storage device 100. The sensor data may be stored locally, sent over the network 130 or displayed via display 214.

The shippable storage device 100 may be configured with multiple layers of security. For example, data stored on the device may be encrypted one or more times, with one or more keys. The keys may be determined, stored, controlled or held by various parties and applied at various steps of the illustrated processes. For example, some keys used to encrypt the data stored on the device may be stored separate from the device, while other keys used to encrypt the data on the device may be stored with the device. The encryption keys may be applied in multiple layers, in embodiments.

The shippable storage device 100 may be configured as one or more other types of network-based device or other electronic devices, such as transient local hardware for example. In an example, non-exhaustive list, device 100 may be configured as various combinations of cryptographic hardware and software (e.g., as a type 1 cryptographic device), as a storage gateway, as a web service, a firewall, a high-assurance guard, a server, virtual machine image, one or more dongles, a data warehousing solution or database service box, or the like.

Figure 3:
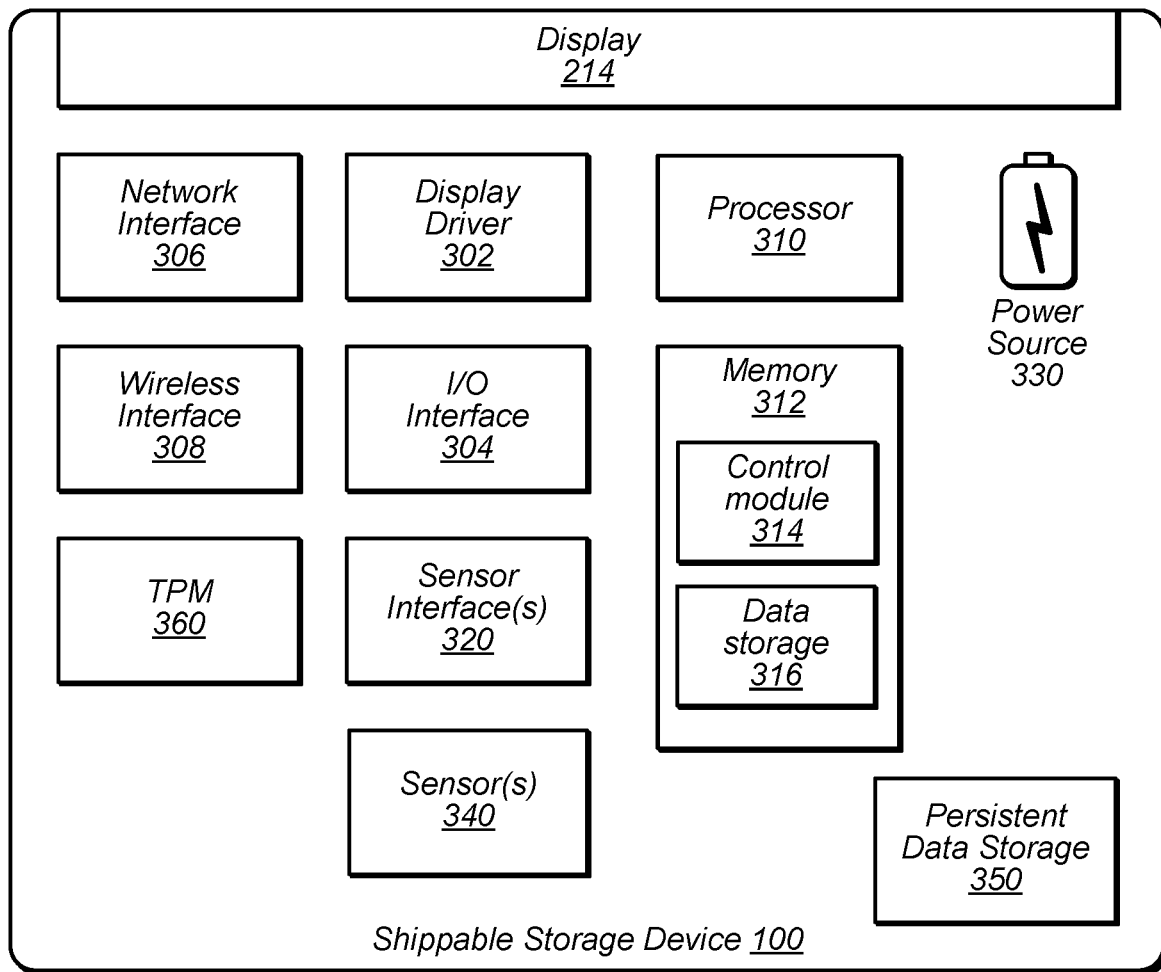
FIG. 3 is a logical block diagram of a shippable storage device, according to some embodiments.

FIG. 3 is a logical block diagram of a shippable storage device 100, according to some embodiments. FIG. 3 illustrates various components and modules of a shippable storage device 100. The device may be configured with fewer or additional components or modules. Some component or module may be replaced by other component or modules. For example, the processor 310 and memory 312 may be replaced by firmware, in embodiments. Various components or modules may perform some or all of the processes illustrated in the FIGs., in embodiments.

In FIG. 3, device 100 is illustrated with display 214, network interface 306 and persistent storage 350. In the illustrated embodiment, display driver 302 provides an interface function between a processor 310 and display 214. For example, to instruct the display to display an address, processor 310 executes computer instructions from memory 312 that send messages to display driver 302 that are interpreted by the display driver and cause the display driver to display the address on display 214.

Network interface 306 acts as an interface between an external network (e.g., a customer network or a service provider network or network 106) and the device. In embodiments, the network interface is configured to transmit instructions to the device or to transmit encrypted data to the persistent storage 350. Wireless interface 308 may be configured to receive (e.g., via cellular or Wi-Fi network) instructions from the service provider. For example, the service provider 120 may send updated address information to the shippable storage device 100 via a cellular network such that the displayed address of the device is updated en route, thereby changing the destination for the device in-flight such that the device is shipped to the updated address instead of the prior address.

Input/Output (I/O) interface 304 may be configured to coordinate I/O traffic between processor 310, memory 312, the display driver, network interface 306, wireless interface 308, sensor interface(s) 320 and persistent storage 350 or peripheral interface. In some embodiments, I/O interface 304 may perform any necessary protocol, timing or other data transformations to convert data signals from one component (e.g., system memory 312) into a format suitable for use by another component (e.g., processor 310). In some embodiments, I/O interface 304 may include support for devices attached through various types of peripheral buses, such as a variant of the Peripheral Component Interconnect (PCI) bus standard or the Universal Serial Bus (USB) standard, for example. In some embodiments, the function of I/O interface 340 may be split into two or more separate components, such as a north bridge and a south bridge, for example. Also, in some embodiments, some or all of the functionality of I/O interface 304, such as an interface to system memory 312, may be incorporated directly into processor 310.

The shippable storage device 100 is depicted with persistent data storage 350. Persistent data storage 350 may include any combination of non-volatile storage such as hard drives or flash memory. Persistent storage 350 may be configured (e.g., during a provisioning process) to store large amounts of encrypted data (e.g., from a large data store such as a customer storage system) during shipment from the customer location to a service provider location where the data is transferred to a service provider storage system.

The shippable storage device 100 is depicted with power source 330 that may power the various electronic components of the shippable storage device 100 and with sensor(s) 340 and sensor interface(s) 320. As described above, any of various sensor(s) may be incorporated into device 100. Device 100 may also include various sensor interface(s) 320 that act as an interface between the sensor(s) 340 and I/O interface 304. The sensor interfaces may be proprietary interfaces, customized for a particular sensor, in embodiments. The sensor interfaces may perform various functions such as conversions of data, analysis of sensor output and output of information based on the analysis or the like.

The shippable storage device 100 is also depicted with a trusted platform module (TPM) 360. The TPM 360 may provide additional security features for the shippable storage device 100. For example, after the storage service provider 102 receives a TPM 360 from a customer, the storage service provider 102 may communicate with the TPM 360 to determine whether a change has been made to the configuration of the shippable storage device 100. Changes to the shippable storage device 100 configuration may indicate that the shippable storage device 100 was tampered with and that a third party may have accessed data on the shippable storage device 100.

Data Transfer Device Lifecycle

Figure 4:
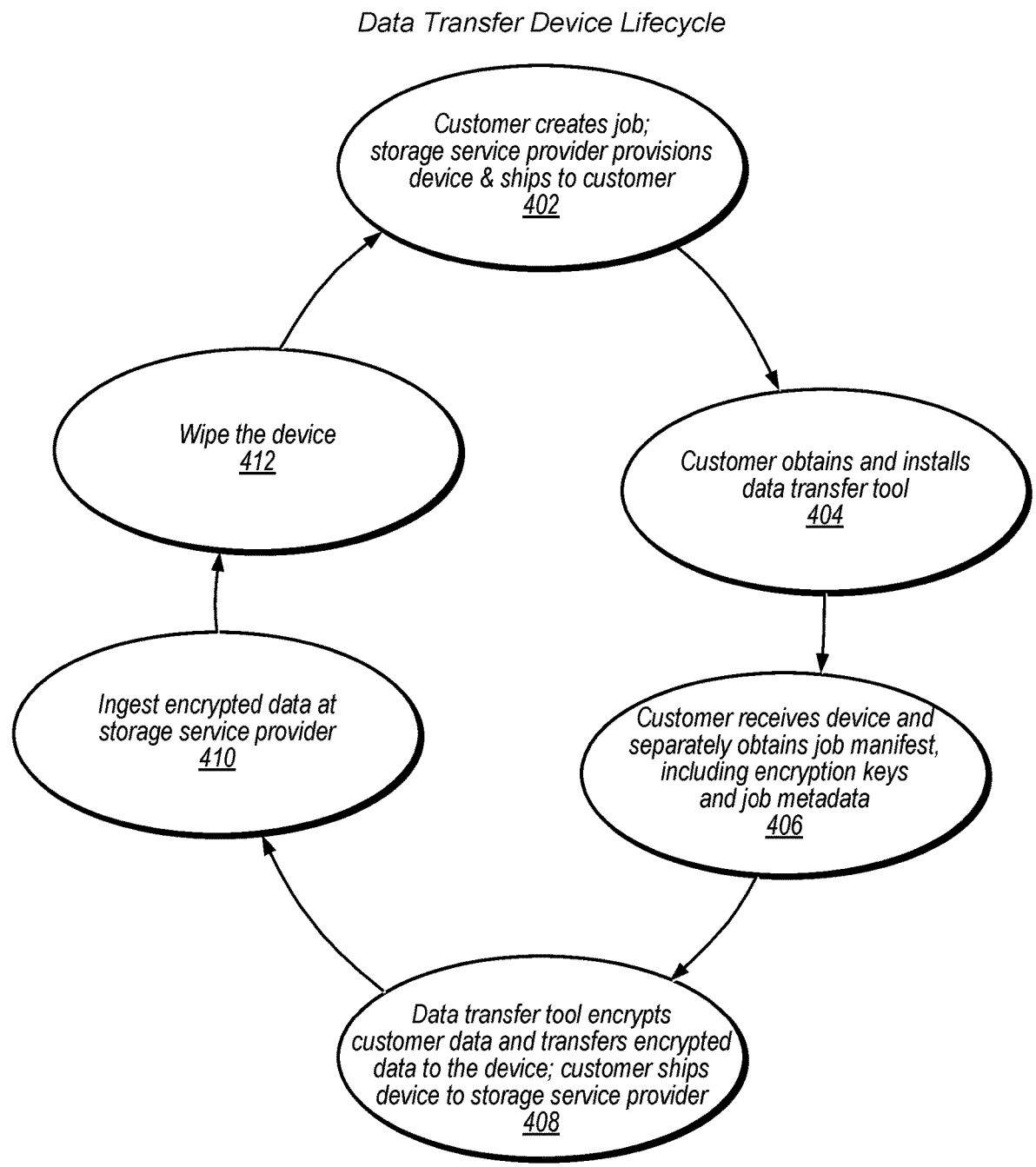
FIG. 4 is a flow diagram of a process of securely transferring data using a shippable storage device, according to some embodiments.

FIG. 4 is a flow diagram of a process of securely transferring data using a shippable storage device 100, according to some embodiments. The illustrated process may be performed within the context of a shippable storage device 100, storage service provider 102 and customer. The process is shown as a data transfer lifecycle for a shippable storage device 100.

At 402, a customer creates a data import job for importing data into a storage service provider 102. The customer may create the job through a console interface of a computing device that provides communication with the storage service provider 102 over a network 106. The storage service provider 102 may then provision a shippable storage device 100 and set an electronic display 108 of the shippable storage device 100. For example, the storage service provider 102 may set the electronic display 108 (e.g., via the display 108 user interface or via an external connection through the network interface) to display a customer destination address. In some embodiments, the storage service provider 100 may also store a return address or the address of another customer facility in memory of the shippable storage device 100 such that the display 108 can be updated with the stored address at some point later in the data transfer device lifecycle.

The storage service provider 102 then ships the shippable storage device 100 to the customer. In some embodiments, the shippable storage device 100 may be shipped as a self-contained shipping container to a destination that is indicated by the device's electronic display 108. For example, the storage service provider may provide the shippable storage device 100 with the enclosure, the display 108, the persistent storage and the network interface to a common carrier without any additional packaging or labeling. The common carrier may ship the device through the carrier network to the destination without any packaging or labeling in addition to the enclosure and electronic display, in embodiments. In some embodiments, the shippable storage device 100 has no display 108, and therefore a label and/or packaging is required to display the destination address.

At 404, the customer obtains and installs a data transfer tool that is configured to encrypt and transfer the customer data to the shippable storage device 100. For example, the customer may download the data transfer tool. In some embodiments, the data transfer tool is stored on a hardware storage device, such as a CD or other persistent storage medium, and received by the customer. In some cases, the customer may already have the data transfer tool installed. For example, the customer may have used the data transfer tool for one or more import jobs in the past.

At 406, the customer receives the shippable storage device 100. The device is installed onto a network at the customer site. The installation may include several steps, described in more detail below. The customer also downloads a job manifest. In some embodiments, the job manifest is obtained separately from the data transfer tool. They may be downloaded in different communication sessions and/or through different communication pathways. For example, the job manifest may be sent via email or on a separate device, such as a USB key. The job manifest includes encryption keys and metadata associated with the job. The encryption keys may be used to encrypt customer data before the customer data is stored onto the shippable storage device 100. The metadata may include identification information for the data import job, the shippable storage device 100, and encryption keys. The job manifest itself may also be encrypted. The encryption key to decrypt the job manifest can be delivered in the same or alternate communication path, as is done with the job manifest itself.

At 408, the data transfer tool encrypts customer data and transfers the encrypted customer data to the shippable storage device 100. The data transfer tool may generate encryption keys to encrypt the customer data. The data transfer may also use encryption keys from obtained from the job manifest to encrypt the customer data.

The electronically displayed destination may then be updated and the shippable storage device 100 shipped as a self-contained shipping container to the updated destination indicated by the device's electronic display. The display may be updated with a destination address or code that was stored in memory of the shippable storage device 100 at provisioning or received over a network (network 106) while en route or at the customer location. The updated address may be a return address for returning the device to the storage service provider 102 or an address of another location for the same or different customer (e.g., security provisions may be implemented such that data from multiple customers can be stored on the device, so that the device is shipped to other locations before finally being shipped back to the storage service provider 102). The shippable storage device 100 is shipped to the storage service provider 102. In some embodiments, the shippable storage device 100 can be shipped to one or more other customer locations until the shippable storage device 100 is updated with the storage service provider 102 address and given to a carrier to ship back to the storage service provider 102.

At 410, the encrypted data from the shippable storage device 100 is ingested at the storage service provider 102. For example, the shippable storage device 100 is received by the service provider 102, connected to a service provider network, the data from the shippable storage device 100 is decrypted, and the decrypted data is stored at one or more storage locations of the storage service provider 102. At 412, the shippable storage device 100 is wiped of data (e.g., customer data and security information deleted or overwritten) and prepared for reuse. The process may begin again at 402.

Secure Data Transfer Scheme

Figure 5:
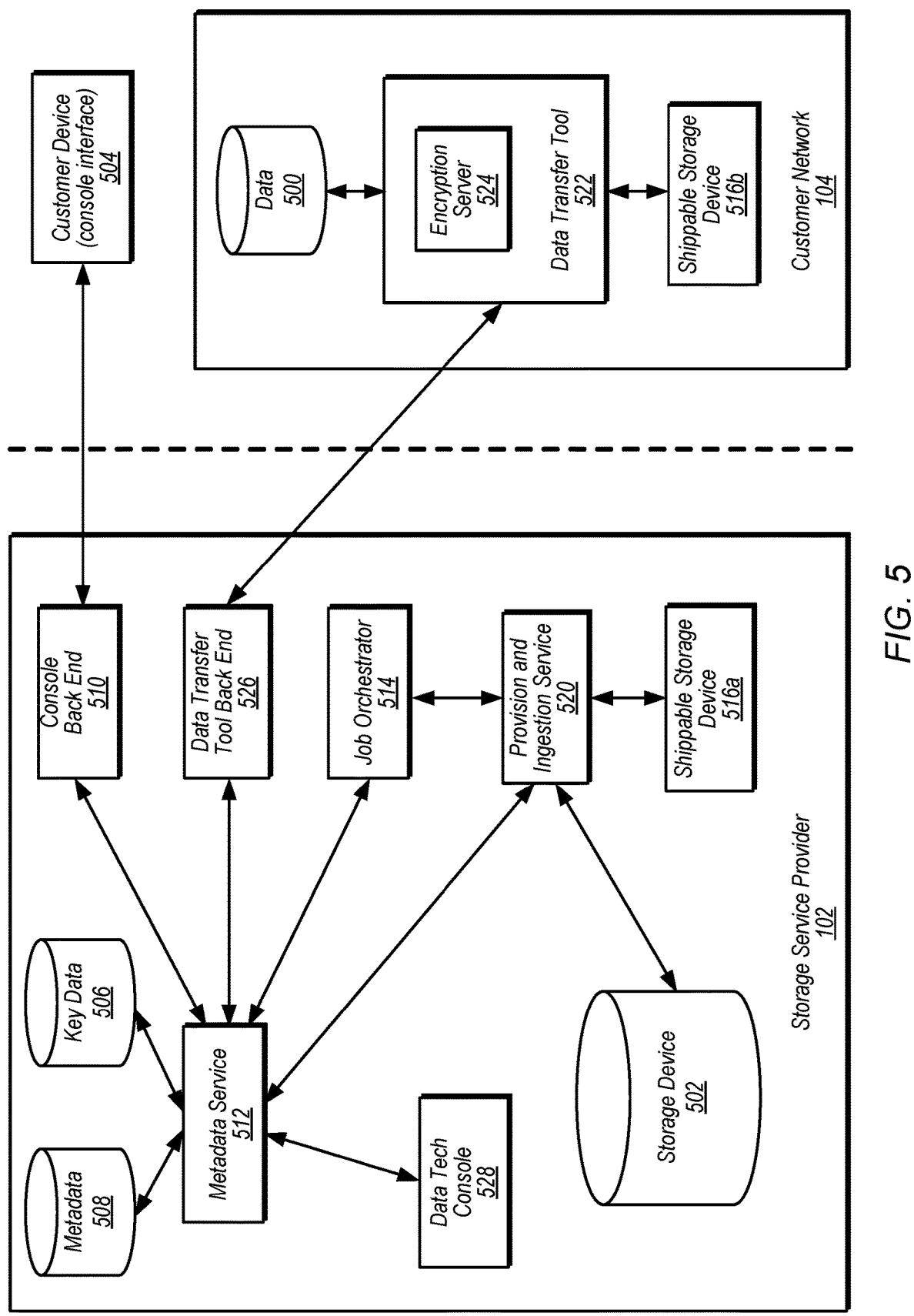
FIG. 5 is a logical block diagram illustrating a secure data transfer scheme using a shippable storage device, according to some embodiments.

FIG. 5 is a logical block diagram illustrating a secure data transfer scheme using a shippable storage device 100, according to some embodiments. The storage service provider 102 may be set up by an entity such as a company or a public sector organization to provide one or more services (such as various types of cloud-based storage and computing) accessible via the Internet and/or other networks to a customer. The storage service provider 102 may include numerous data centers hosting various resource pools, such as collections of physical and/or virtualized computer servers, storage devices, networking equipment and the like, needed to implement and distribute the infrastructure and services offered by the storage service provider 102. In embodiments, storage service provider 102 may provide various storage services, such as storing or transferring at least some of the data 500 for a customer in storage device 502 of the storage service provider 102. In some embodiments, the customer data 500 that is transferred to the storage device 502 may be organized into one or more different logical or physical locations (e.g., buckets) within storage device 502, where each bucket stores one or multiple data objects or files.

A customer may submit a request via a console interface and/or programmatic application of a customer device 504 to the storage service provider 102 to create a data import job for importing at least some of the data 500 to the storage service provider 120. The customer device 504 may be a computing device that provides a user interface and/or application that allows the customer to submit the job request to the storage service provider 102 (e.g., via the network 106). In some embodiments, the customer provides information for the data import job, such as one or more locations at the storage service provider 102 to store customer data 500 (e.g., one or more buckets within the storage device 502). The customer may also indicate a role to assign to the storage service provider 102 (e.g., read/write and other permissions associated with importing the data 500). In some instances, the customer may also select one or more encryption keys to use for encrypting data for the import job.

For example, the customer may select one or more encryption keys stored at the storage service provider 102 that belong to or are assigned to the customer. In an embodiment, the encryption keys are stored in data storage of the storage service provider 102, such as in key data 506 or metadata 508. In some embodiments, the customer may instead or additionally request that one or more new encryption keys be generated by the storage service provider 102 for the data import job.

In the example embodiment, the customer device 504 communicates with the console back end 510 of the storage service provider 102. The console back end 510 may be a service capable of communicating with the customer device 504 as well as other services of the storage service provider 102, such as the metadata service 512. In some instances, the console back end 510 receives the data import job information described above and sends at least some of the job information to the metadata service 512 for processing.

The metadata service 512 may supply at least some of the job information to the job orchestrator 514, which in turn may start the process of provisioning a shippable storage device 100 for a new import job. For example, the job orchestrator 514 may write information to a shippable storage device 516a or cause other services to write information to the shippable storage device 516a that prepares the shippable storage device 516a for secure data transfer. In some embodiments, a provision and ingestion service 520 or other service writes information to the shippable storage device 516a to prepare the shippable storage device 516a for secure data transfer. The provision and ingestion service 520 may obtain the information from the job orchestrator 514 and/or the metadata service 512.

In various embodiments, the provision and ingestion service 520 represents two or more separate services that each provide different services. For example, the provision and ingestion service 520 may include a first service that provides provisioning services before shipping a shippable storage device 100 to a customer and a second service that provides data ingestion services after receiving the shippable storage device 100 from a customer.

In some embodiments, the information written the shippable storage device 516a may include security information such as one or more encryption keys or certificates, address information, and/or other device-related information. After the shippable storage device 516a is provisioned with the information, the display 108 may be updated to display the address of the customer that requested the data import job. The storage service provider 102 may then ship the shippable storage device 516a to the customer.

In some instances, the customer installs a data transfer tool 522 onto the customer network 104. The data transfer tool 522 is an application that encrypts customer data 500 and transfers the encrypted customer data to a shippable storage device 516b. The data transfer tool may provide a user interface (e.g., graphical user interface and/or command line interface) on a display of a computing device of the customer network 104 in order to receive input from a user and to provide output. The shippable storage device 516b may represent the shippable storage device 516a after is arrives at the customer network 104.

In various embodiments, the data transfer tool 522 includes an encryption server 524 to perform at least some of the encryption of the customer data 500. The customer may download the data transfer tool 522 from the storage service provider 102 over the network 106. In some embodiments, the customer downloads the data transfer tool 522 via a computing device of the customer network 104, such as a computing device that includes the data transfer tool 522.

In some embodiments, the data transfer tool 522 downloads a manifest and manifest encryption key associated with a data import job from the data transfer tool back end 526 of the storage service provider 102 via the network 106. In other embodiments the data transfer tool 522 uses a previously downloaded manifest and manifest encryption key associated with the data import job. The manifest may include information associated with a particular data import job that the customer requested using the customer device 504. Further, the particular import job may be associated with the shippable storage device 516b. For example, the shippable storage device 516b may have been provisioned and shipped in response to the customer submitting a data import job request through the customer device 504. In some instances, the manifest may include metadata associated with the data import job such as a job ID, a device ID, security information, encryption keys, and locations for storing data in the storage device 502 (e.g., bucket ID's). In some embodiments, the data transfer tool 522 uses at least some of the information from the manifest to process and transfer the customer data 500 to the shippable storage device 516b.

In some embodiments, the data transfer tool back end 526 may also receive information from the data transfer tool 522. For example, the data transfer tool back end 526 (or other service) may provide instructions to the data transfer tool 522 to implement a data transfer plan for one or more shippable storage devices 100 connected to the customer network 104. For example, the instructions may coordinate which portions of the customer data 500 are copied onto corresponding shippable storage devices 100, depending on one or more characteristics of the customer network or data 500 (e.g., transfer speeds for each connection with each shippable storage device 100, format of data 500, characteristics of a storage destination of the data 500). In embodiments, the data transfer tool back end 526 may manage the generation of shards based on redundant data encoding (e.g., erasure encoding, data striping, etc.) for the data 500. Thus, any of the processes associated with the data transfer tool 522 may instead be controlled remotely by the data transfer tool back end 526, or in cooperation with the data transfer tool 522. In some embodiments, the data transfer tool back end 526 monitors data collected by a shippable storage device 100 attached to the customer network 104 (e.g., to monitor performance/health of one or more client systems and efficiency of transferring data to one or more shippable storage devices).

In some embodiments, the data transfer tool 522 may also execute algorithms to develop plans and patterns for data placement on one or more shippable storage devices 100 connected to the customer network 104. For example, the plans and patterns may coordinate which portions of the customer data 500 are copied onto corresponding shippable storage devices 100, depending on one or more characteristics of the customer network or data 500 (e.g., transfer speeds for each connection with each shippable storage device 100, format of data 500, characteristics of a storage destination of the data 500). In embodiments, the data transfer tool 522 may manage the generation of shards based on redundant data encoding (e.g., erasure encoding, data striping, etc.) for the data 500. Thus, any of the processes associated with the data transfer tool 522 may operate autonomously and not require communication or coordination with any other processes, services, or tools.

The storage service provider 102 may also include a data tech console 528. The data tech console 528 may be a service that communicates with one or more other services, such as the metadata service 512. In some embodiments, the data tech console provides information to an interface, such as a graphical user interface or command line interface of a display, that allows a data technician to view and change information associated with the storage service provider 102. For example, the data tech console may provide information regarding the status of various data import jobs processed by the storage service provider 102 or provide data stored on the storage device 502, key data 506, and metadata 508.

FIGS. 6-26 illustrate various processes and systems associated with the shippable storage device 100. One or more portions of the illustrated processes may be performed by one or more processes executing on the storage service provider 102 and/or the customer network 104, in embodiments (e.g., one or more of the services described in FIG. 5). In some embodiments, one or more portions of the illustrated process may associate with a particular data import job for importing data 500 from the customer network 104 to the storage service provider 102. In some instances, the same or similar processes and systems may be implemented for the storage service provider 102 and/or the customer network 104 to transfer/export data from the storage service provider 102 to the customer network 104. Further, any job-related information generated or processed may be stored in one or more locations of the storage service provider 102, such as key data 506, metadata 508, and the storage device 502.

Figure 6:
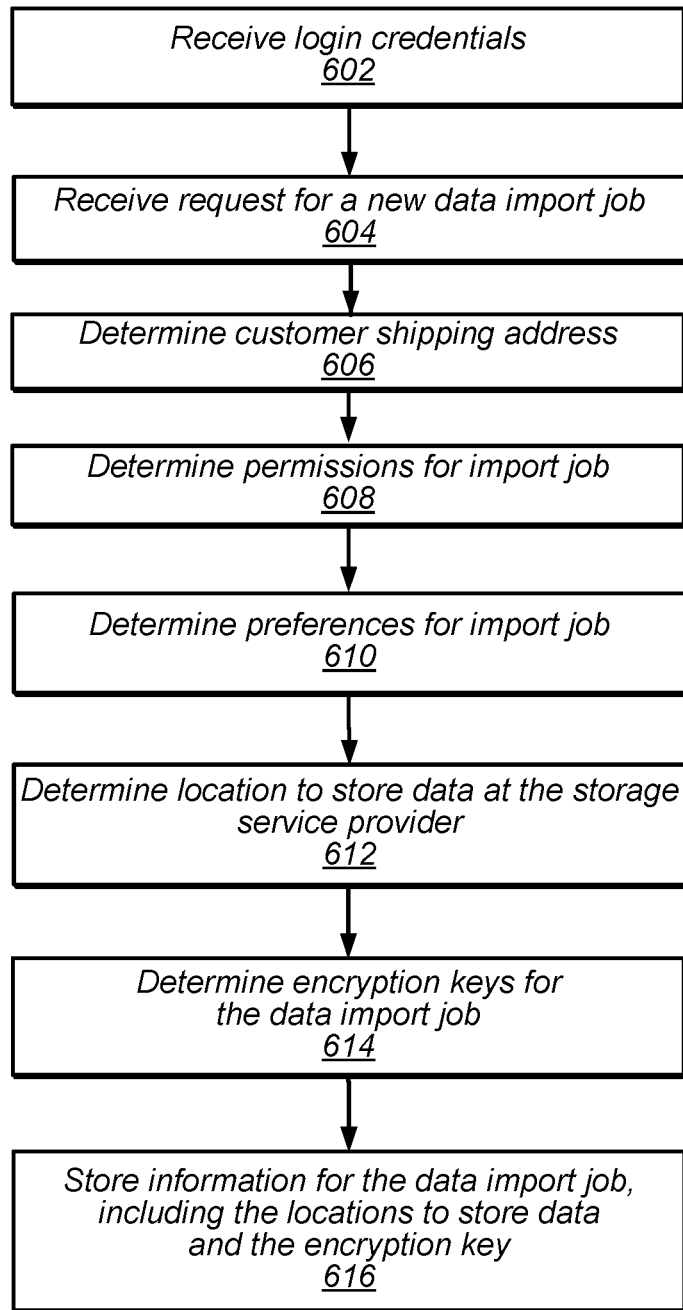
FIG. 6 is a flow diagram of a process for collecting information for a new data import job to securely transfer data using a shippable storage device, according to some embodiments.

FIG. 6 is a flow diagram of a process for collecting information for a new data import job to securely transfer data using a shippable storage device 100, according to some embodiments. One or more portions of the illustrated process may be performed via one or more service of the storage service provider 102, such as by console back end 510.

At block 602, the storage service provider 102 receives login credentials (e.g., username, password, and/or one or more other security codes) from a customer device 504. In some embodiments, a console back end 510 may be configured to receive the login credentials and upon verifying the credentials, authenticate the customer and provide access and management of data import and/or export jobs through the console interface of the customer device 504. The console interface may provide an indication of a status of one or more data import jobs of the customer. Thus, the console back end 510 may receive information from the customer network 104 and provide information to the customer network 104. The storage service provider 102 may use at least some of the received information for provisioning a shippable storage device 100 for secure data transfer.

At block 604, the console back end 510 may receive the request for a new data import job. In some embodiments, the console back end 510 forwards the request to the metadata service 512, which generates information associated with the new job, such as a job ID. The console back end 510 may then receive the generated information and present at least some of the generated information to the customer via the console (e.g., displaying the job ID for the new data import job).

At block 606, the console back end 510 may determine the customer shipping address for shipment of the shippable storage device 100. In some embodiments, the console back end 510 determines the customer address by reading a customer address that is associated with the customer and stored on the storage service provider 102. In some instances, the customer provides the customer address via the customer device 504, such as through a user interface.

At block 608, the console back end 510 may determine permissions for the import job. In some embodiments, the console back end 510 determines the customer address by reading the permissions associated with the customer that are stored on the storage service provider 102. In some instances, the customer provides the permissions via the customer device 504, such as through a user interface. The permissions may specify reading, writing, or other permissions suitable for associating with one or more particular roles for accessing or handling the imported data. Thus, in embodiments, a role is determined for the data import job, where the role is a set of one or more permissions given to the storage service provider 102 and/or other entity.

At block 610, the console back end 510 may determine preferences for the import job. In some embodiments, the console back end 510 determines at least some of the preferences by reading preferences associated with the customer that are stored on the storage service provider 102. In some instances, the customer provides the preferences via the customer device 504, such as through a user interface. The preferences may specify whether the customer receives a notification of the status of one or more corresponding activities associated with the data import job (e.g., data import progress, data import completed, etc.) and how the customer receives notifications (email, SMS text message, phone call, etc.).

At block 612, the console back end 510 determines a location to store data the imported data at the storage service provider 102. For example, the console back end 510 receives from the customer device 504 an indication of a location to store data at the storage service provider 102 (e.g., a particular type of service or location of the storage service provider 102). In some embodiments, the console back end 510 receives an indication of multiple available locations to store customer data 500 at the storage service provider 102. In some embodiments, the console back end 510 receives one or more location ID's (e.g., bucket ID's) from the metadata service 512 that correspond to one or more available locations to store data. The console back end 510 may then receive the location ID's and provide them to the customer device 504 for display. The console back end 510 may then receive an indication of one or more of the location ID's from the customer.

At block 614, the console back end 510 determines one or more encryption keys for the data import job. In some embodiments, the console back end 510 may select one or more available encryption keys stored in key data 506. In some instances, the console back end 510 may receive from the customer device 504 a selection of one or more available encryption keys stored in key data 506. In some embodiments, the console back end 510 generates one or more of the encryption keys. In various embodiments, a combination of selected keys and generated keys may be used.

At block 616, the storage service provider 102 stores information for the data import job, including any of the information received or determined at blocks 602-614. In some embodiments, the console back end 510 saves the information in key data 506 and/or metadata 508.

Figure 7:
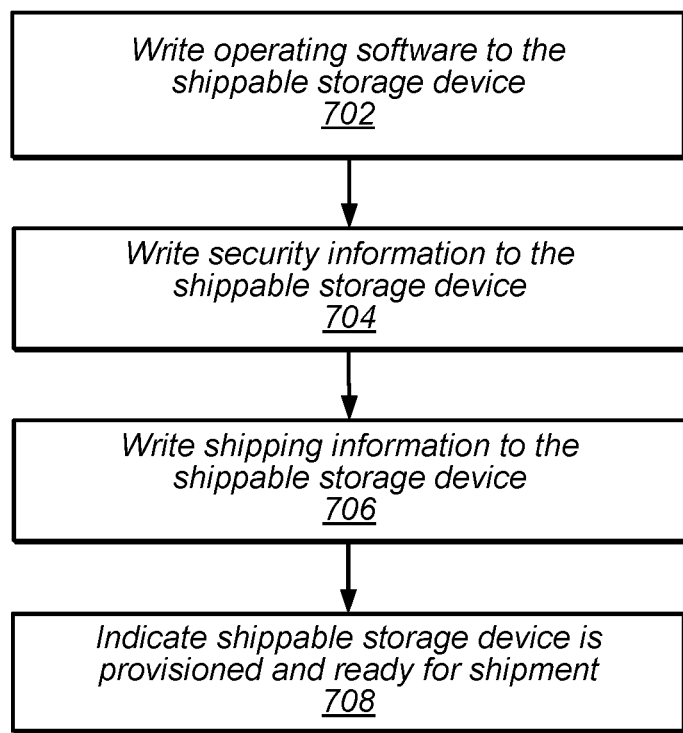
FIG. 7 is a flow diagram of a process for provisioning a shippable storage device to securely transfer data for a data import job, according to some embodiments.

FIG. 7 is a flow diagram of a process for provisioning a shippable storage device 100 to securely transfer data for a data import job, according to some embodiments. One or more portions of the illustrated process may be performed via the storage service provider 102, such as by the provision and ingestion service 520 and/or other services.

At block 702, the storage service provider 102 writes operating software to the shippable storage device 100. For example, a provisioning service may write an operating system and servers to the shippable storage device 100. One of the servers may allow a device of the customer network 104 to communicate with the shippable storage device 100 through a command line or graphical user interface (e.g., to communicate with the data transfer tool 522). In some embodiments, the provisioning service may also write a display server to the shippable storage device 100 that sends information to the display 108 (e.g., to display a shipping address).

At block 704, the storage service provider 102 writes security information to the shippable storage device 100. For example, a provisioning service may write a security certificate or root certificate to the shippable storage device 100 that allows a device of the customer network 104 to authenticate the shippable storage device 100 based on receiving the security information from the shippable storage device 100 and processing the received security information. The security information may also allow the shippable storage device 100 to authenticate the device of the customer network 104 based on receiving the security information from the device of the customer network 104 and processing the received security information. Thus, the security information written to the shippable storage device 100 may be used in a mutual authentication processes between the shippable storage device 100 and a device of the customer network 104.

At block 706, the storage service provider 102 writes shipping information to the shippable storage device 100. For example, a provisioning service may write a shipping address of the customer and a shipping address of the storage service provider 102 to the shippable storage device 100. The shippable storage device 100 may display different destination shipping addresses for the shippable storage device 100, depending on what part of the data transfer cycle the shippable storage device 100 is on. In some embodiments, one or more of the shipping addresses may be updated by the storage service provider 102 or the customer if either determines that the shipping address has changed.

At block 708, the storage service provider 102 indicates that the shippable storage device 100 is provisioned and ready for shipment to the customer. For example, a provisioning service may store or update information in metadata 508 that indicates the shippable storage device 100 is provisioned and ready for shipment. In some embodiments, the provisioning service may generate and send a message to another service or device of the storage service provider 102 to indicate that the shippable storage device 100 is provisioned and ready for shipment.

Figure 8:
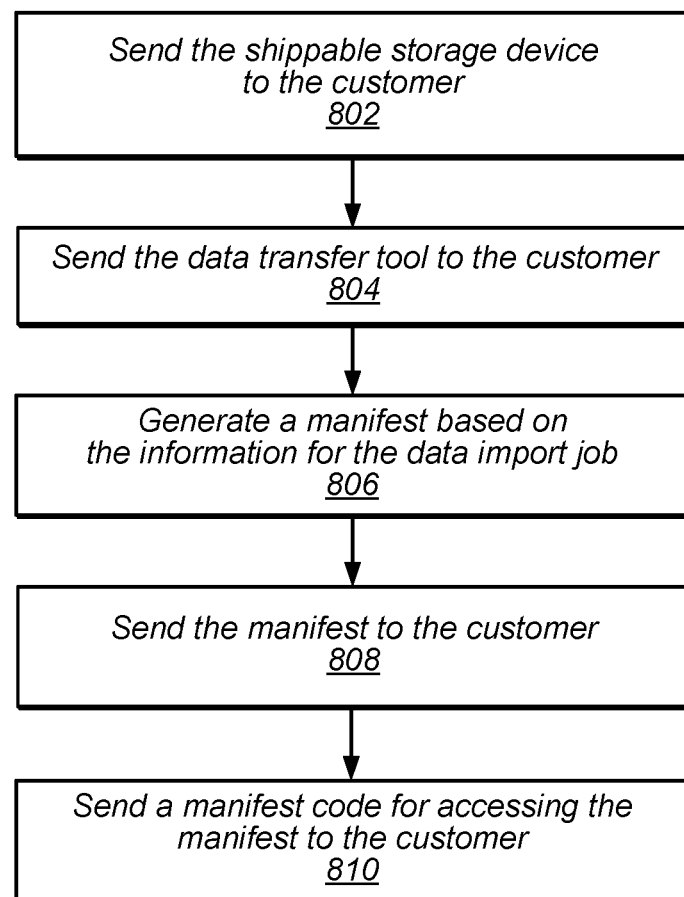
FIG. 8 is a flow diagram of a process for sending a shippable storage device and a manifest to a customer, according to some embodiments.

FIG. 8 is a flow diagram of a process for sending a shippable storage device 100 and a manifest to a customer, according to some embodiments. One or more portions of the illustrated process may be performed via the storage service provider 102, such as by the job orchestrator 514, the provision and ingestion service 520, and/or other services.

At block 802, the storage service provider 102 sends the shippable storage device 100 to the customer. For example, the shippable storage device 100 is sent to a location of the customer network 104. The shippable storage device 100 may be sent via one or more suitable forms of transportation.

At block 804, the storage service provider 102 sends the data transfer tool 522 to the customer. In some embodiments, the storage service provider 102 sends the data transfer tool 522 to a device of the customer network 104 via the network 106. For example, the data transfer tool 522 may be sent via email attachment, via an internet session, or any other suitable means for sending via the network 106. In some instances, the data transfer tool 522 may be stored on a storage device and shipped to the customer. After the customer obtains the data transfer tool 522, the customer may install the data transfer tool 522 on the customer network 104.

At block 806, the storage service provider 102 generates a manifest based on information for a data import job. In some embodiments, the storage service provider 102 creates one or more files that contain security information, one or more encryption keys, and metadata associated with the data import job. The security information may include information for authenticating the shippable storage device 100 and/or allowing the shippable storage device 100 to authenticate a device of the customer network 104. The metadata may include information that identifies one or more data storage locations in storage device 502. In some embodiments, the metadata may associate one or more of the data storage locations with one or more of the encryption keys.

At block 808, the storage service provider 102 sends the manifest to the customer. In some instances, the storage service provider 102 sends the manifest to the customer network 104 in response to determining that the shippable storage device 100 is attached to the customer network. In some embodiments, the storage service provider 102 encrypts the manifest with an encryption key before sending it to the customer network 104. For example, the storage service provider 102 may use an encryption key from key data 506 that is assigned to the customer or generate an encryption key to encrypt the manifest. In some embodiments, the manifest may be sent via email attachment, via an internet communication session, or any other suitable means for sending via the network 106. In some instances, the manifest may be stored on a storage device and shipped to the customer. After the customer obtains the manifest, the customer may decrypt the manifest via the data transfer tool 522, if it is encrypted. In some embodiments, the customer enters a code (e.g., numbers, letters, and/or symbols) and if the code is correct, the data transfer tool 522 decrypts the manifest. In some instances, the customer uses an encryption key that may be stored within the customer network 104 to decrypt the manifest.

At block 810, the storage service provider 102 sends a manifest code for accessing the manifest to the customer. In some embodiments, the manifest code may be sent via email attachment, via an internet session, or any other suitable means for sending via the network 106. In some instances, the manifest code may be stored on a storage device and shipped to the customer. After the customer obtains the manifest code, the customer may access the manifest by entering the manifest code into the data transfer tool 522. In some embodiments, at least two of the data transfer tool, the manifest, and the manifest code are sent separately.

Figure 9:
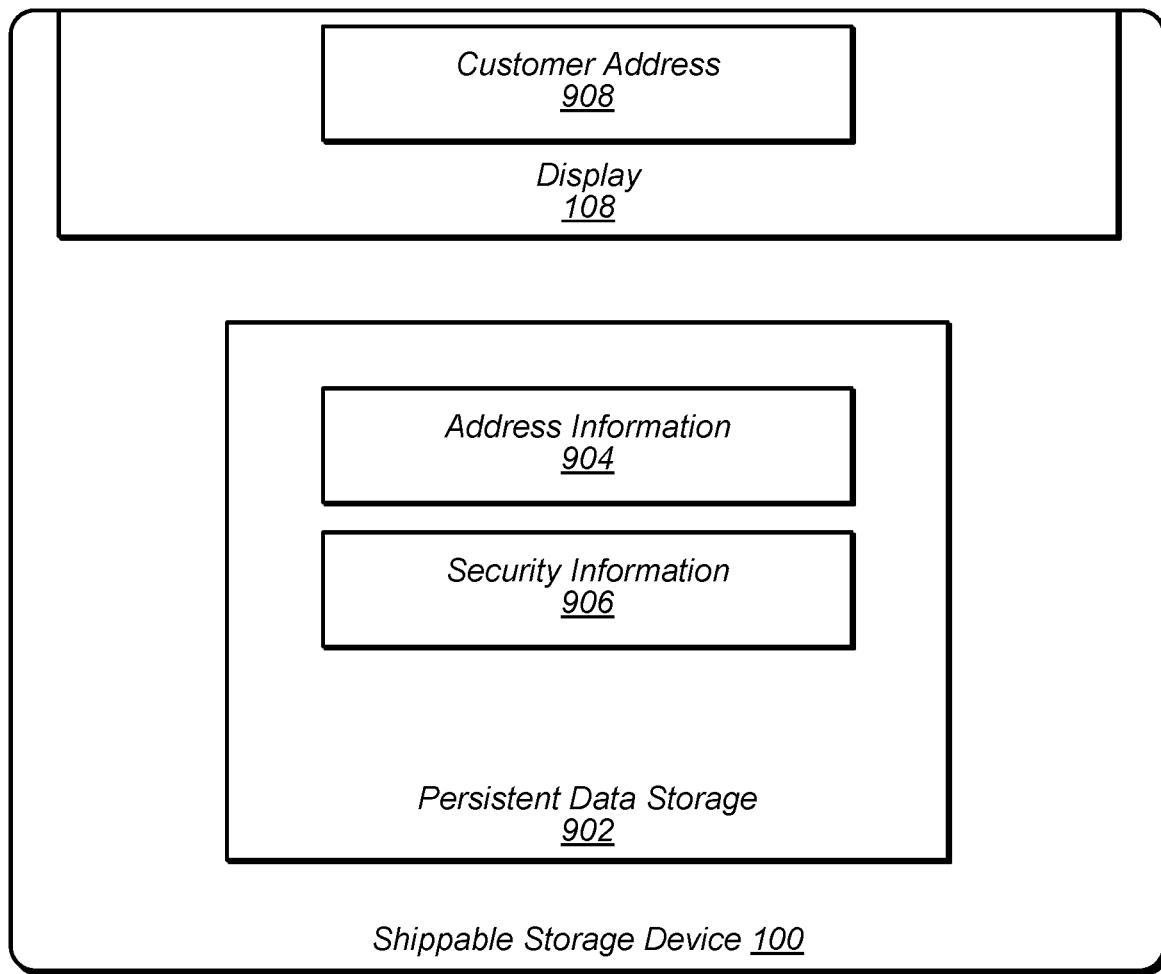
FIG. 9 is a logical block diagram of a shippable storage device ready for shipping to a customer, according to some embodiments.

FIG. 9 is a logical block diagram of a shippable storage device 100 ready for shipping to a customer, according to some embodiments. The shippable storage device 100 may include a persistent data storage 902. The persistent data storage 902 may include information associated with the data import job. In some embodiments, the information may include address information 904, such as a shipping address of the storage service provider 102 and/or the shipping address associated with the customer network 104. The address information may store the next shipping address after the customer address and/or one or more other intermediate destination addresses for the shippable storage device 100. In some embodiments, the address information 904 includes one or more shipping labels, wherein each shipping label corresponds to a particular destination address. The shipping label may include any information necessary to display a shipping label on the display 108, including at least any information that a conventional printing label would provide. Further, the information may include security information 906, such as security certificates and/or encryption keys. In some instances, the information may include a device ID 704 to uniquely identify the shippable storage device 100 and/or an import ID to identify the data import job associated with the shippable storage device 100.

In various embodiments, the display 108 may display a customer address 908 of the customer. For example, the customer address 908 may be the shipping address associated with the customer network 104 when the shippable storage device 100 is being shipped to the customer. Conversely, when the shippable storage device 100 is being shipped from the customer back to the storage service provider 102, the shipping address of the storage service provider 102 may be displayed by the display 108. In some instances, at least some of the address information 904 and the security information 906 stored in the persistent data storage 702 may be provided by the storage service provider 102 when the shippable storage device 100 is provisioned.

Figure 10:
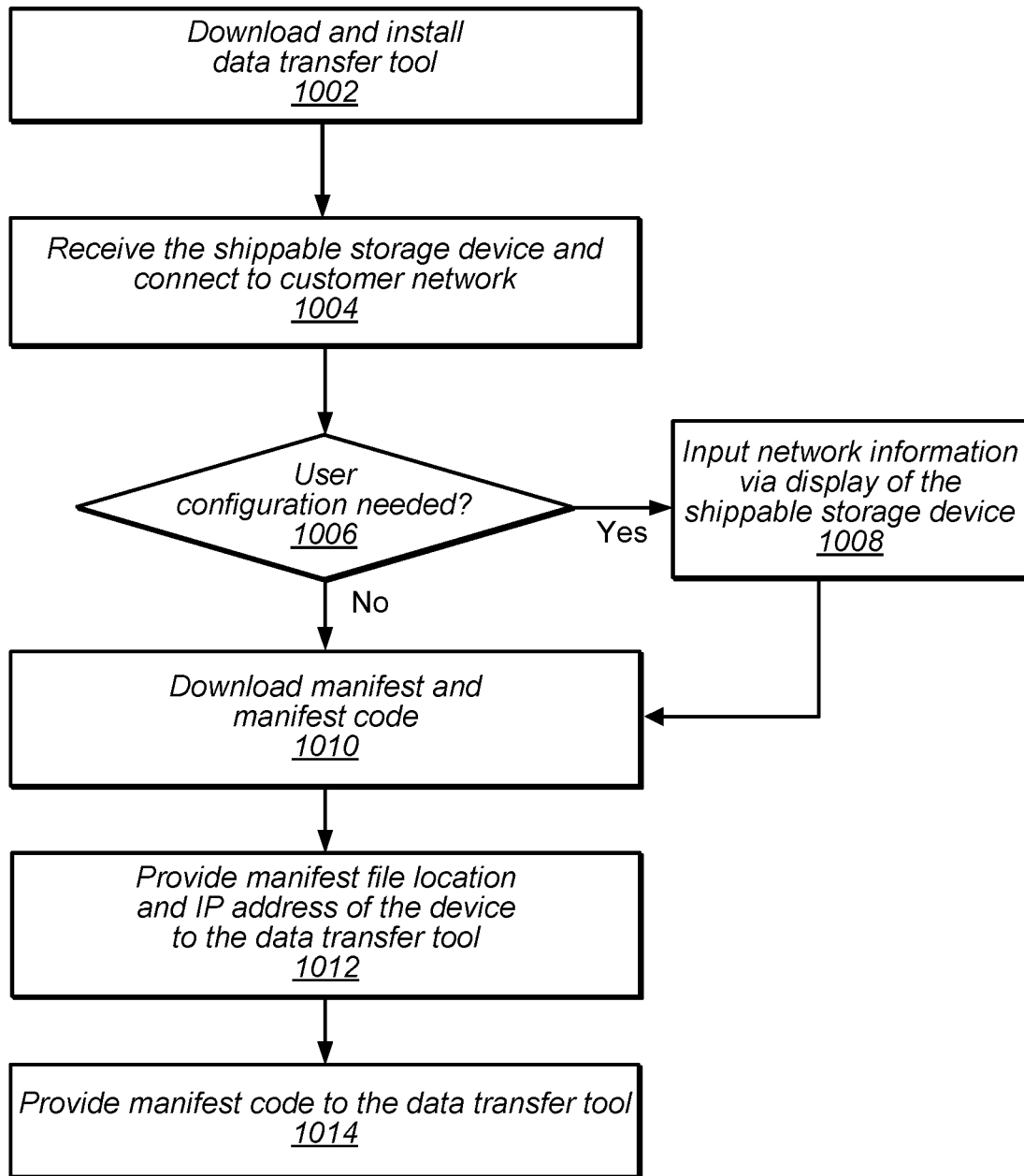
FIG. 10 is a flow diagram of a process for receiving a shippable storage device and information for a data import job, according to some embodiments.

FIG. 10 is a flow diagram of a process for receiving a shippable storage device 100 and information for a data import job, according to some embodiments. One or more portions of the illustrated process may be performed via the customer, such as by using the data transfer tool 522.

At block 1002, the customer downloads the data transfer tool 522 from the storage service provider 102 and installs the data transfer tool 522 on a computer system at the customer network 104. In some embodiments, the customer may use the customer device 504 or other computing device to download the data transfer tool 522 from the storage service provider 102. Before downloading the data transfer tool 522, the customer may be required to enter credentials that are verified by the storage service provider 102. In some instances, the data transfer tool 522 may already be installed at the customer location. For example, the data transfer tool 522 may have been used for a previous data import job.

At block 1004, the customer receives the shippable storage device 100 and connects the shippable storage device 100 to the customer network 104. In some embodiments, one or more security steps may be performed to authenticate the shippable storage device 100 before connecting the shippable storage device 100 to the customer network. For example, one or more bar codes may be scanned and RFID chips may be read. In various embodiments, any other suitable verification techniques may be used to authenticate the shippable storage device 100 before connecting the shippable storage device 100 to the customer network 104. The customer then connects the shippable storage device 100 to the customer network via the network interface 240 of the device. In some embodiments, the shippable storage device 100 has multiple network interfaces that are each a different type of network interface. In some instances, there are two or more network interfaces of a particular type. The customer may select a network interface to connect the shippable storage device 100 to the customer network 104.

At block 1006, in response to being connected to the customer network 104, the shippable storage device 100 and/or the data transfer tool 522 determines whether user configuration is needed for the shippable storage device 100. In some embodiments, the shippable storage device 100 and/or the data transfer tool 522 determines that user configuration is required to select one or more network-related configuration, such as an IP address, a type of network interface used (e.g., optical, SPF), a netmask, and a gateway. In some embodiments, in response to determining that user configuration is required for the shippable storage device 100, the process continues to block 1008. In some embodiments, a user configuration will be needed if the user decides to override one or more default settings for the network parameters or other parameters related to the shippable storage device 100 and/or the customer network 104.

At block 1008, the display 108 of the shippable storage device 100 may provide a user interface that permits a user to enter one or more configuration parameters for the shippable storage device 100, such as IP address, a type of network interface used (e.g., optical, SPF), a netmask, and a gateway. The display 108 may provide multiple touch-enabled keys that allow the user to enter one or more parameters. In various embodiments, other suitable techniques may be implemented to allow a user to enter parameters for the shippable storage device 100. The process then continues to block 1010.

At block 1006, if the shippable storage device 100 determines that user configuration is not needed for the shippable storage device 100, the process continues to block 1010. At block 1010, the customer downloads a manifest and a manifest code from the storage service provider 102. In some embodiments, the customer downloads the manifest and manifest code from the data transfer tool back end 526 of the storage service provider 102.

In some instances, the customer may download the manifest and/or manifest code using a different pathway or application, such as via the customer device 504 or other computing system of the customer network 104. For example, the manifest may be downloaded using a different path or application than that of the manifest code. In some embodiments, the manifest may be downloaded using the same path, but at a different point in time or via a separate session or transaction. Further, in some instances, the manifest code may be delivered via email, text message, physical mail, or any other suitable form for communicating a code. In various embodiments, the manifest code may be composed of one or more numbers, letters, and/or symbols.

At block 1012, the customer provides the manifest file location and the IP address of the shippable storage device 100 to the data transfer tool 522. For example, the customer may provide a directory path and file name of the manifest file to the data transfer tool 522. In various embodiments, other suitable identifiers for the location of the manifest file may be provided to the data transfer tool 522. Further, in some instances, the manifest file location and/or the IP address of the shippable storage device 100 may be automatically detected or stored in the data transfer tool 522, eliminating the need for a user to enter either or both.

At block 1014, the customer provides the manifest code to the data transfer tool 522. In some embodiments, the customer may provide the manifest code, the manifest file location, and/or the IP address of the shippable storage device 100 at substantially the same time (e.g., using the same screen of a user interface or a series of associated user interfaces). In some instances, in response to providing the manifest code to the data transfer tool 522, the data transfer tool 522 decrypts the manifest using the manifest code and/or a customer-assigned key and provides access to the information in the manifest, including encryption keys. The data transfer tool may initiate the process of identifying customer data 500, encrypting the identified customer data 500 and/or transferring the encrypted customer data 500 to the shippable storage device 100. In some instances, in response to providing the manifest code, the data transfer tool 522 may determine whether the manifest code is correct. If it is not correct, the data transfer tool 522 may provide a message indicating that an incorrect code was provided and prompt for a user to enter another manifest code. In various embodiments, in response to validating the manifest code, the data transfer tool 522 accesses and/or obtains one or more encryption keys of the manifest.

Figure 11:
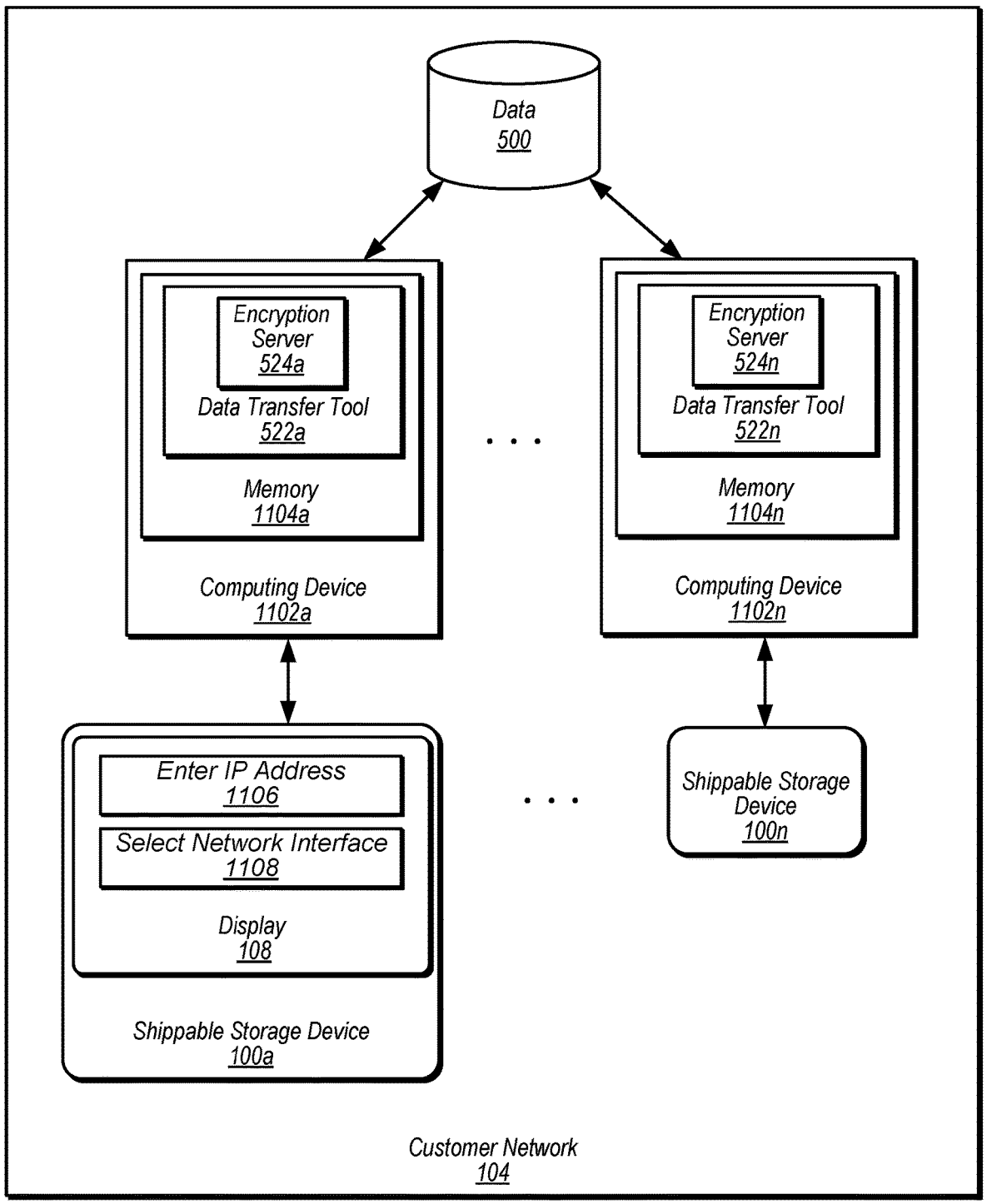
FIG. 11 is a logical block diagram of shippable storage device connected to a customer network, according to some embodiments.

FIG. 11 is a logical block diagram of shippable storage devices 100 connected to a customer network 104, according to some embodiments. In some embodiments, multiple shippable storage devices 100a-100n may be connected to the customer network 104. For example, each of the shippable storage devices 100 may communicate with a corresponding computing device 1102 that includes a memory 1104 that further includes the data transfer tool 522 and the encryption server 524. Further, each computing device 1102 may communicate with one or more data storage devices that include the customer data 500 to be imported from the customer to the corresponding data storage service 102. In some embodiments, multiple data import jobs are requested by the customer, each import job associated with a different one of the shippable storage devices 100. The shipping devices associated 100 with the multiple data import jobs may be connected to the customer network 104 concurrently and download encrypted data concurrently.

In various embodiments, a particular memory 1104 of a computing device 1102 may implement multiple instances of the data transfer tool 522. Furthermore, two or more of the multiple instances may communicate with one particular shippable storage device. In some embodiments, a particular instance of the data transfer tool 522 may communicate with multiple shippable storage devices. Thus, the relationship between interaction between data transfer tools 522 and the shippable storage devices 100 may be one-to-one, many-to-one, one-to many, or many-to-many. The above relationships may also apply whether the data transfer tools 522 are implemented on one computing device 1102 or across multiple computing devices 1102.

In some instances, in response to the storage service provider 102 determining that multiple shippable storage devices 100 will be required for an amount of data for a particular data import job request, the storage service provider 102 will create two or more new data import jobs, wherein each of the new data import jobs corresponds to a different portion of the customer data 500 to be imported. Further, each of the new data import jobs may correspond to a different shippable storage device 100.

In some embodiments, the display 108 may be capable of receiving input via touch. The display 108 may display one or more graphical elements that are associated with one or more corresponding options for a user to enter information associated with the shippable storage device 100. For example, a first button 1106 may be selectable by a user for entering an internet protocol (IP) address for the shippable storage device 100. After selecting the first button 1102 via touch, the user may be presented multiple touch-enabled keys that allow the user to enter an IP address. In some embodiments, an IP address is automatically assigned to the shippable storage device 100 after the shippable storage device 100 is connect to a network of the customer (e.g., via DHCP). The data transfer tool 522 may use the IP address of the shippable storage device 100 in order to establish communication with the shippable storage device 100.

In some embodiments, the display 108 may display a second button 1108 that is selectable by a user for entering a type of network interface for the shippable storage device 100. For example, after selecting the second button 1108 via touch, the user may be presented with two or more touch enabled buttons, each button representing a different type of network interface (e.g., RJ45, SPF, optical). Any other suitable options for a network interface type may be available for selection by the user, in embodiments.

Figure 12:
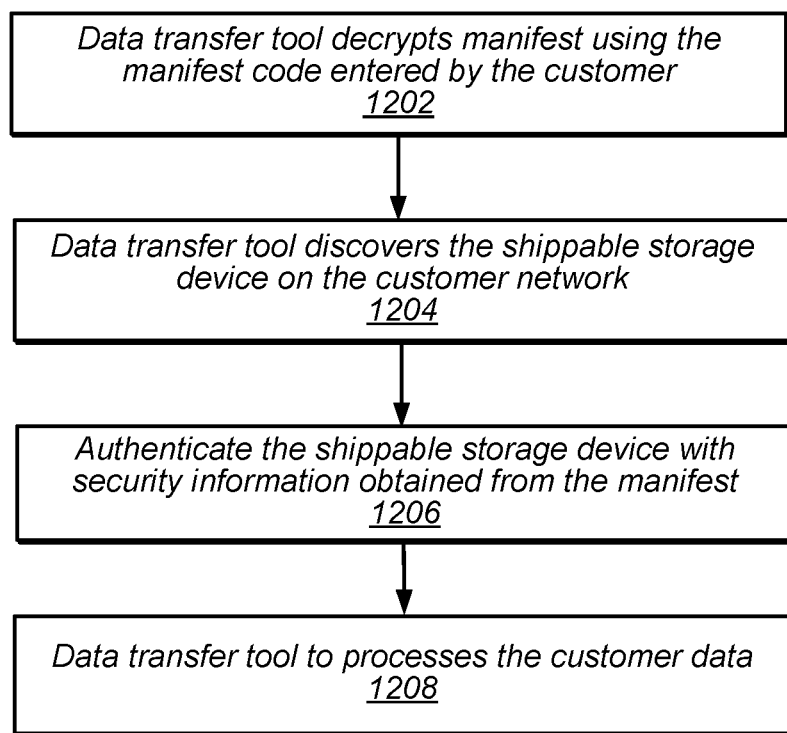
FIG. 12 is a flow diagram of a process for decrypting a manifest and authenticating a shippable storage device, according to some embodiments.

FIG. 12 is a flow diagram of a process for decrypting a manifest and authenticating a shippable storage device, according to some embodiments. One or more portions of the illustrated process may be performed via the customer, such as by using the data transfer tool 522.

At block 1202, the data transfer tool 522 decrypts the manifest using the manifest code. In some embodiments, the manifest is decrypted by a key that is provided by the customer to the data transfer tool 522. In some instances, the key is downloaded from the storage service provider 102 separately from the manifest (e.g., a separate communication session or downloaded by a different computing device of the customer network 104). When a user provides the key to the data transfer tool 522 (e.g., via a user interface) the data transfer tool 522 may decrypt the manifest and access the encryption keys, security information, and/or other data associated with the data import job.

At block 1204, the data transfer tool 522 discovers the shippable storage device 100 on the customer network 104. The data transfer tool 522 may discover the shippable storage device 100 based at least on the IP address of the shippable storage device 100. The IP address may be assigned in various ways, such as those described in FIG. 10.

At block 1206, the data transfer tool 522 authenticates the shippable storage device 100 with the security information obtained from the manifest. For example, the data transfer tool 522 may read a root certificate or encryption key from the shippable storage device 100 and process the certificate or encryption key with the security information from the manifest to authenticate the device (e.g., verify that the shippable storage device 100 is the same device that was shipped from the storage service provider 102). In some embodiments, the shippable storage device 100 also authenticates the data transfer tool 522 and the customer network 104 based on reading a root certificate or encryption key from the data transfer tool 522 and processing the certificate or encryption key with the security information on the shippable storage device 100 to authenticate the data transfer tool 522 and/or the computing device 1102 of the customer network 104. Thus, the data transfer tool 522 and the shippable storage device 100 may mutually authenticate each other.

At block 1208, the data transfer tool 522 generates a virtual file system on the customer network for the data transfer tool to process data. In some embodiments, the virtual file system includes volatile and/or non-volatile memory configured to store a copy of at least some of the customer data 500 and to store processing results of the customer data. For example, the data transfer tool 522 may encrypt data stored in the virtual file system and store the encrypted data in the virtual file system. In some embodiments, the encrypted data is then copied from the virtual file system to the shippable storage device 100.

Figure 13:
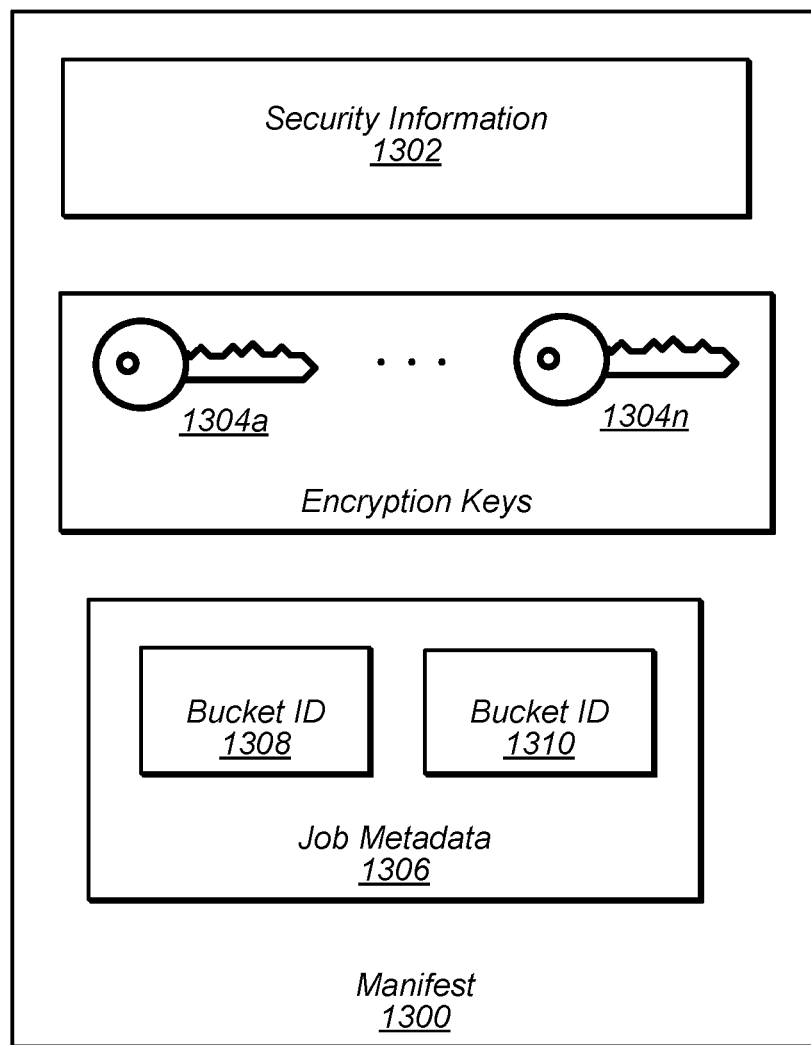
FIG. 13 is a logical block diagram of a manifest including information associated with a data import job, according to some embodiments.

FIG. 13 is a logical block diagram of a manifest 1300 including information associated with a data import job, according to some embodiments. In some embodiments, the manifest 1300 is downloaded by the customer using the data transfer tool 522. If the customer has not yet installed the data transfer tool 522, then the customer may need to install it before downloading the manifest 1300.

In some embodiments, the data transfer tool 522 communicates with a service of the data storage provider 102, such as the data transfer tool back end 526, in order to download the manifest 1300. The customer may be required to enter credentials and/or a job ID in order for the data transfer tool 522 to download the manifest 902. In some instances, the shippable storage device 100 associated with the data import job may first need to be connected to a network of the customer 100 and detected by the data transfer tool 522 and/or the storage service provider 102 before the manifest 1300 can be downloaded. Therefore, the storage service provider 102 may send the manifest 1300 for a particular data import job to the data transfer tool 522 in response to determining that the shippable storage device 100 attached to the customer network 104 is associated with the particular data import job (e.g., by obtaining/verifying security information from the device, such as via a root certificate).

The manifest 1300 may include various types of information associated with the import job, at least some of which is used to encrypt and/or transfer data to the shippable storage device 100. In some embodiments, the manifest 1300 includes security information 1302 that the customer uses to authenticate the shippable storage device 100. For example, the data transfer tool 522 may use a certificate or key from the manifest 1300 to authenticate the shippable storage device 100 based on obtaining security information from the shippable storage device 100.

In some embodiments, the manifest 1300 includes one or more encryption keys 1304 that are used to encrypt keys and/or data before the encrypted keys and/or data are transferred to the shippable storage device 100 or sent to the storage service provider via a network 106. The encryption keys 1304 may be associated with the customer and stored at one or more secure locations of the storage service provider 102, such as key data 506 or metadata 508. One or more of the encryption keys 1304 may have existed before the import job was created. For example, the encryption keys 1304 may be stored at key data 506 and associated with the customer. In some instances, one or more of the encryption keys 1304 may have been generated in response to the request for the import job and associated with the customer.

One or more of the encryption keys 1304 may be used for encrypting one or more other encryption keys that are generated by the data transfer tool 522, before being stored on the shippable storage device 100. Different encryption keys 1304 may be used to encrypt different subsets of encryption keys before being transferred to the shippable storage device 100. For example, each of the encryption keys 1304a-n may encrypt a different subset of encryption keys generated by the data transfer tool 522.

In some embodiments, each of the encryption keys 1304 may correspond to a different storage location of the storage service provider 102. For example, the encryption key 1304a may correspond to a first bucket of the storage device 502 of the storage service provider 102 and the encryption key 1304n may correspond to a second bucket of the storage device 502. Thus, any subset of the data 500 that is associated with a key encrypted by the encryption key 1304a will eventually be stored in the first bucket (in decrypted or encrypted form) and any subset of the data 500 that is associated with a key encrypted by the encryption key 1304n will eventually be stored in the second bucket (in decrypted or encrypted form). Moreover, in some instances, two or more of the encryption keys 1304 may be associated with the same location of the storage device 502. In some embodiments, the encryption keys 1304 are used to encrypt at least some of customer data 500 instead of or in addition to encryption keys.

In various embodiments, the manifest 1300 includes job metadata 1306, which includes information associated with the data import job and/or the shippable storage device 100 being used for the data import job. The job metadata 1306 may include information identifying one or more locations at the storage service provider 102 at which different portions of customer data 500 are to be stored, such as bucket ID 1308 and bucket ID 1310. Furthermore, each location identifier may be associated with one or more encryption keys 1304. For example, bucket ID 1308 may be associated with one or more encryption keys 1304 and bucket ID 1310 may be associated with one or more other encryption keys 1304.

Therefore, in some embodiments, portions of customer data 500 that are associated with encryption key 1304a will be stored in the bucket of storage device 502 that corresponds to bucket ID 1308 and portions of customer data 500 that are associated with encryption key 1304n will be stored in the bucket of storage device 502 that corresponds to bucket ID 1310. Although the example embodiment implements two bucket ID's and two corresponding buckets, any other number of bucket ID's and buckets may be implemented. Further, any other suitable mapping scheme may be implemented for associating one or more of the encryption keys 1304 to a corresponding one or more storage locations within the storage device 502 of the storage service provider.

In various embodiments, the job metadata 1306 may include additional information associated with a particular data import job. For example, the job metadata 1306 may include a device ID or a job ID that identifies the particular data import job associated with importing customer data 500 using the shippable storage device 100.

Figure 14:
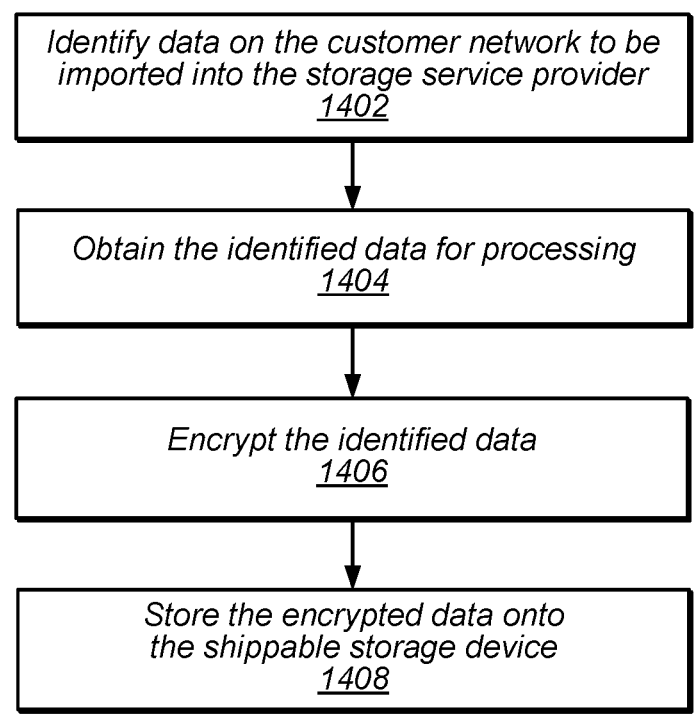
FIG. 14 is a flow diagram of a process for storing encrypted data onto a shippable storage device, according to some embodiments.

FIG. 14 is a flow diagram of a process for storing encrypted data onto a shippable storage device, according to some embodiments. One or more portions of the illustrated process may be performed by the data transfer tool 522.

At block 1402, the data transfer tool 522 identifies data 500 on the customer network 104 to be imported into the storage service provider 102. In some embodiments, the data transfer tool 522 may receive an indication of the data 500 to be imported, such as by a user interface associated with the data transfer tool 522. In some instances, the data transfer tool 522 determines at least some of the data 500 to be imported based on information in the job manifest 1300.

At block 1404, the data transfer tool 522 obtains the identified data 500 for processing. For example, the data transfer tool 522 may copy the identified data 500 into one or more portions of memory associated with the data transfer tool 522. In some embodiments, the data transfer tool 522 copies the identified data to a file system or virtual file system associated with the customer network 104. In various embodiments, the data transfer tool 522 may copy the identified data 500 to any type of storage location or file system suitable for storing, encrypting, and processing the identified data 500. At least some of the data 500 may be stored in the memory 1104 and/or other storage devices associated with the computing device 1102. Thus, the data transfer tool 522 may use any combination of volatile and/or non-volatile memory capable of storing the processing results of the data transfer tool, receiving copies of the data 500, and transferring encrypted data and keys onto the shippable storage device 100.

At block 1406, the data transfer tool 522 encrypts the identified data 500. In some embodiments, data transfer tool 522 generates encryption keys for encrypting the identified data 500 and/or the generated encryption keys. In some instances, the data transfer tool 522 encrypts at least some of the identified data 500 and/or encryption keys using encryption keys obtained from the manifest 1300. At block 1408, the data transfer tool 522 stores (e.g., transfers) the encrypted data and encrypted keys onto the shippable storage device 100.

In some embodiments, the data transfer tool 522 communicates via an API (application programming interface) on the shippable storage device 100 in order to transfer encrypted data onto the shippable storage device and perform other functions. Thus, data may be pulled from the data transfer tool 522 or pushed to the tool. In some instances, a virtual file system is mounted on the computing device 1102 that hosts the data transfer tool 522. Standard system copying commands may then be used to transfer files to the virtual file system and onto the shippable storage device 100 (thus, pushing data to the tool). In various embodiments, the data transfer tool 522 may provide its own API so that API calls may be made to the data transfer tool 522 (e.g., a put command that pushes data to the tool).

Figure 15:
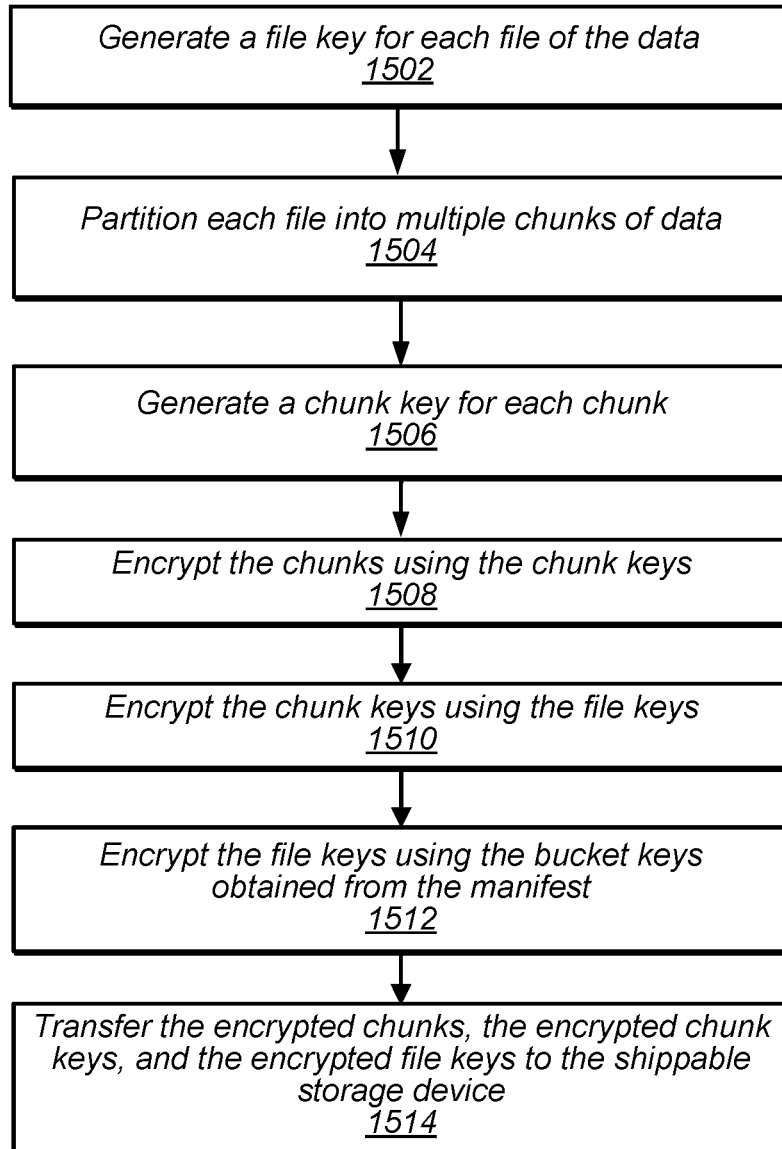
FIG. 15 is a flow diagram of a process for encrypting data and keys and storing the encrypted data and encrypted keys onto a shippable storage device, according to some embodiments.

FIG. 15 is a flow diagram of a process for encrypting data and keys and storing the encrypted data and encrypted keys onto a shippable storage device 100, according to some embodiments. One or more portions of the illustrated process may be performed via the data transfer tool 522. In various embodiments, the data transfer tool 522 generates encryption keys using any suitable technique for generating keys for encrypting data.

At block 1502, the data transfer tool 522 generates a file key for each file of data 500 to be transferred onto the shippable storage device 100. In embodiments, the file key generated for a particular file may be used for encrypting other encryption keys (e.g., chunk keys) that encrypt the actual data of the particular file. In other embodiments, the file key generated for a particular file is used to encrypt the data of the file. In some instances, each file of the data 500 is a portion of the data 500 identified by the data transfer tool 522 as capable of being partitioned into two or more chunks of data. In some embodiments, a file of the data 500 may be an object that includes a file of data and additional metadata that describes one or more characteristics associated with the file (e.g., a path associated with the file, file size, file type).

In some embodiments, each file key may be unique with respect to the file keys generated for the files in the virtual file system. In some instances, the same file key may be used for encrypting chunk keys and/or data for two or more files. For example, a first file key may be generated for use with a first group of files, a second file key may be generated for use with a second group of files, and so on. In this way, processing time may be reduced and fewer processing resources may be required to generate keys.

At block 1504, the data transfer tool 522 partitions each file into multiple data chunks. Thus, in some embodiments, each file may be separated into two or more chunks of data. In some instances, each chunk of data for a particular file may be the same size or approximately the same size. In some embodiments, metadata may be added to each chunk (e.g., the file the chunk is from, a chunk key or chunk key ID associated with the chunk, a file key or file key ID associated with the chunk, chunk order, and/or sequence number for assembling back into a file at a later point).

At block 1506, the data transfer tool 522 generates a chunk key for each chunk of the data to be transferred onto the shippable storage device 100. In embodiments, each chunk key encrypts the corresponding chunk before the chunk is transferred to the shippable storage device 100.

In some embodiments, each chunk key may be unique with respect to the chunk keys generated for the files in the virtual file system. In some instances, the same chunk key may be used for two or more chunks from a particular file. For example, a first chunk key may be generated for a first group of chunks from a particular file, a second chunk key may be generated for a second group of chunks from the particular file, etc. In some embodiments, one or more chunk keys that are generated for a first file may be also be used for one or more other files. Using some of the above techniques, processing time may be reduced and fewer processing resources may be required to because fewer chunk key are generated.

At block 1508, the data transfer tool 522 encrypts the chunks using the chunk keys. In some embodiments, each chunk key is assigned to a corresponding chunk and encrypts the corresponding chunk. In some embodiments, a particular chunk key may encrypt two or more chunks.

At block 1510, the data transfer tool 522 encrypts the chunk keys using the file keys. Thus, each file key may encrypt the multiple chunk keys that are associated with the corresponding file. In some embodiments, if the data transfer tool 522 determines that the size of a particular file is below a threshold size, then the data transfer tool 522 encrypts the encrypted chunks associated with the particular file key. In such instances, the data transfer tool 522 may or may not also encrypt the chunk keys associated with the particular file using the associated file key.

At block 1512, the data transfer tool 522 encrypts the file keys using the bucket keys obtained from the manifest 1300. In some embodiments, each file is assigned for storage within a corresponding bucket on the storage device 502 of the storage service provider 102 and therefore each file key is assigned to a bucket key associated with the bucket in which the corresponding file is to be stored. For example, a first file may be assigned to be stored in a first bucket that is associated with one or more bucket keys. Therefore, a file key corresponding to the first file may be encrypted by one of those one or more bucket keys.

In various embodiments, any number of additional levels of encryption may be used to encrypt keys generated by the data transfer tool 522 and/or keys obtained from the manifest 1300. For example, the data transfer tool 522 may generate a first additional level one or more keys that are used to encrypt the file keys. Then, the bucket keys are used to encrypt the first additional level of one or more keys instead of encrypting the file keys. As another example, the data transfer tool 522 may generate a second additional level of one or more keys to encrypt one or more corresponding keys of the first additional level, wherein the first additional level of keys encrypts the file keys.

In some embodiments, the bucket keys are securely stored by the storage service provider 102 and are made temporarily available to the data transfer tool 522 for encrypting the file keys obtained from the manifest 1300. Thus, in embodiments, the bucket keys are deleted from memory associated with the data transfer tool and the computing device 1102 within a short period of time after the bucket keys are used for encryption. In some embodiments, a bucket key is also used to encrypt one or more other portions of data and/or keys. For example, the bucket keys may be used to encrypt other data, keys, encrypted keys, and/or encrypted chunks.

At block 1514, the data transfer tool 522 transfers the encrypted chunks, the encrypted chunk keys, and the encrypted file keys to the shippable storage device 100. In response to determining that the transfer is complete, the data transfer tool 522 may then provide an indication that that the shippable storage device 100 is ready for shipment to the storage service provider 102. For example, the data transfer tool 522 may cause a user interface to display a message that the shippable storage device 100 is ready for shipment or may send a notification to one or more services or devices of the customer network 104. In various embodiments, file keys are not generated. In such cases, one or more bucket keys may be used to encrypt the chunk keys and then the data transfer tool 522 transfers the encrypted chunks to the shippable storage device 100 and may also transfer the encrypted chunk keys to the shippable storage device 100.

In some embodiments, the data transfer tool 522 does not transfer any of the data 500 or keys onto the shippable storage device 100 in an unencrypted form. For example, the data transfer tool 522 may store the encrypted chunks, the encrypted chunk keys, and the encrypted file keys without storing the chunks, chunk keys, and file keys in unencrypted form.

In various embodiments, the data transfer tool 522 may transfer the encrypted chunks to the shippable storage device 100 without transferring the encrypted chunk keys and the encrypted file keys to the shippable storage device 100. The data transfer tool 522 may then send the encrypted chunk keys and the encrypted file keys to the data storage service provider 102 via the network 106, separate from the shippable storage device 100. In various embodiments, the data transfer tool 522 may send the file keys and/or the chunk keys to the data storage service provider 102 via the network 106 in unencrypted form (but within a secure connection) or in a form encrypted by one or more customer-assigned keys that are stored on the storage service provider 102.

In some embodiments, the data transfer tool 522 discovers multiple shippable storage devices 100 attached to the customer network 104. The data transfer tool 522 may then determine a data transfer plan for transferring the encrypted chunks, the encrypted chunk keys, and/or the encrypted file keys to the plurality of the shippable storage devices. Based on the data transfer plan, the data transfer tool 522 may transfer a different portion of the encrypted chunks, the encrypted chunk keys, and/or the encrypted file keys to each of multiple shippable storage devices 100. Furthermore, the transferring to two or more of the shippable storage devices 100 may occur in parallel (e.g., concurrently). The data transfer plan may be based on one or more factors, including a transfer speed associated with one or more of the shippable storage devices 100, an available storage capacity of one or more of the shippable storage devices 100, and one or more characteristics of the source of at least some of the identified data 500 (e.g., type of storage device the data 500 is stored on, a format of the data 500), and one or more characteristics of a destination of at least some of the identified data 500 (e.g., type of storage device the data 500 will be stored on at the remote storage service provider 102, a format of the data 500 as it will be stored at the remote storage service provider 102).

Figure 16:
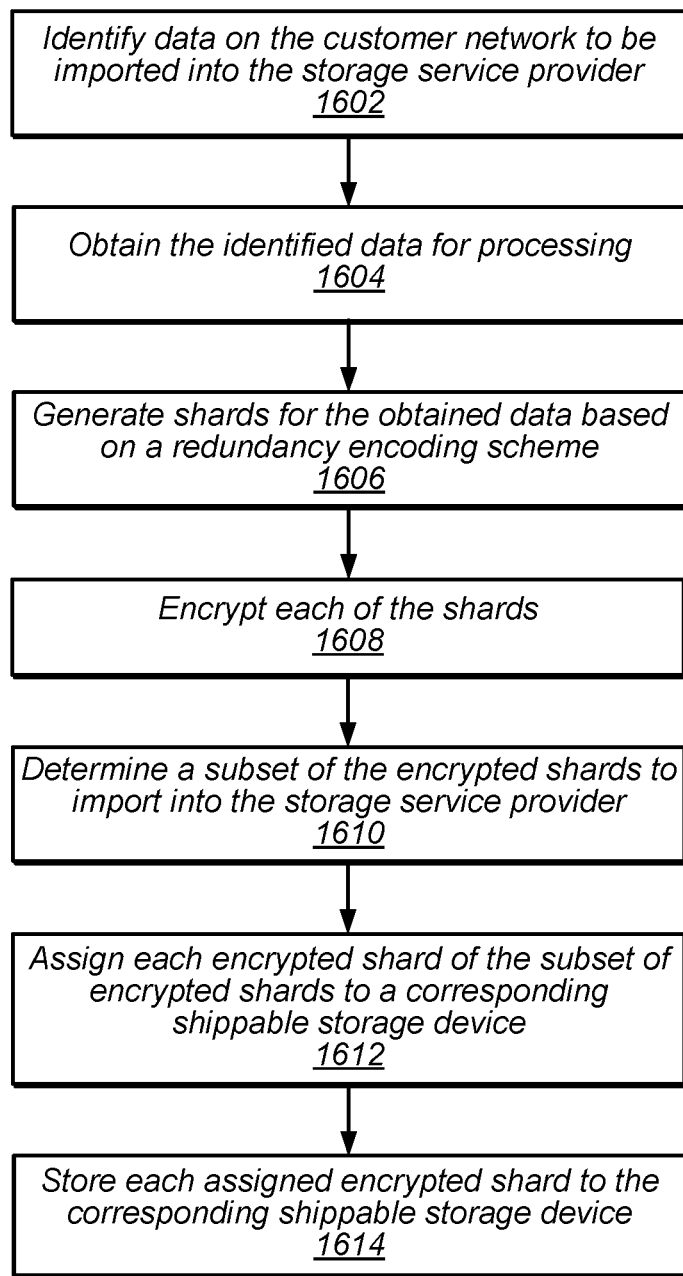
FIG. 16 is a flow diagram of a process for storing encrypted shards onto different shippable storage devices, according to some embodiments.

FIG. 16 is a flow diagram of a process for storing encrypted shards onto different shippable storage devices 100, according to some embodiments. One or more portions of the illustrated process may be performed via the data transfer tool 522.

At block 1602, the data transfer tool 522 identifies data 500 on the customer network 104 to be imported into the storage service provider 102. In some embodiments, the data transfer tool 522 may receive an indication of the data 500 to be imported, such as by a user interface associated with the data transfer tool 522. In some instances, the data transfer tool 522 determines the data 500 to be imported based on information in the job manifest 1300.

At block 1604, the data transfer tool 522 obtains the identified data 500 for processing. For example, the data transfer tool 522 may copy the identified data 500 into one or more portions of memory associated with the data transfer tool 522.

At block 1606, the data transfer tool 522 generates shards (e.g., fragments of the identified data 500) for the obtained data based on a redundancy encoding scheme. In some embodiments, the data transfer tool 522 may generate two or more shards, wherein each of the two or more shards, after being encrypted, are to be stored at two or more corresponding shippable storage devices 100 that are attached to the customer network 104. In embodiments, the data transfer tool 522 generates the two or more shards by applying a redundancy encoding technique (e.g., erasure coding) on the identified data 500. In some embodiments, the identified data may be broken into two or more shards and encoded with portions of redundant data. When the two or more shards are received and decrypted by the storage service provider 102, the identified data 500 may be reconstructed from the two or more shards and imported into the storage service provider 102.

At block 1608, the data transfer tool 522 encrypts each of the generated shards. In some embodiments, the encryption of each of the generated shards is performed in the same or similar manner as the encryption described for FIG. 15. In some embodiments, each shard is treated as one file before being encrypted. In some instances, each shard is split into two or more files before being encrypted.

At block 1610, the data transfer tool 522 determines a subset of the encrypted shards to import into the storage service provider 102, based on a minimum number of shards required to reconstitute data stored among the shards. For example, if a minimum of six out of ten shards are required, then the data transfer tool 522 may determine at least six out of ten total shards to import into the storage service provider. In embodiments, one or more shards remain stored by the customer (e.g., on one or more storage devices associated with the customer network), in case one or more shards are lost or intercepted during shipment.

At block 1612, the data transfer tool 522 assigns each encrypted shard of the subset of encrypted shards to a corresponding shippable storage device 100. At block 1614, the data transfer tool 522 stores each of the assigned encrypted shards to the corresponding shippable storage device 100. The data transfer tool 522 may transfer two or more of the encrypted shards to two of more corresponding shippable storage devices 100 in parallel. Transferring in parallel may reduce the amount of time required for the transfer. In some embodiments, if one or more of the corresponding shippable storage device 100 are not yet attached to the customer network 104, then the data transfer tool 522 keeps the corresponding encrypted shards stored in the virtual file system or other storage location at the customer network 104 until the one or more of the corresponding shippable storage devices 100 are received and attached to the customer network 104.

Figure 17:
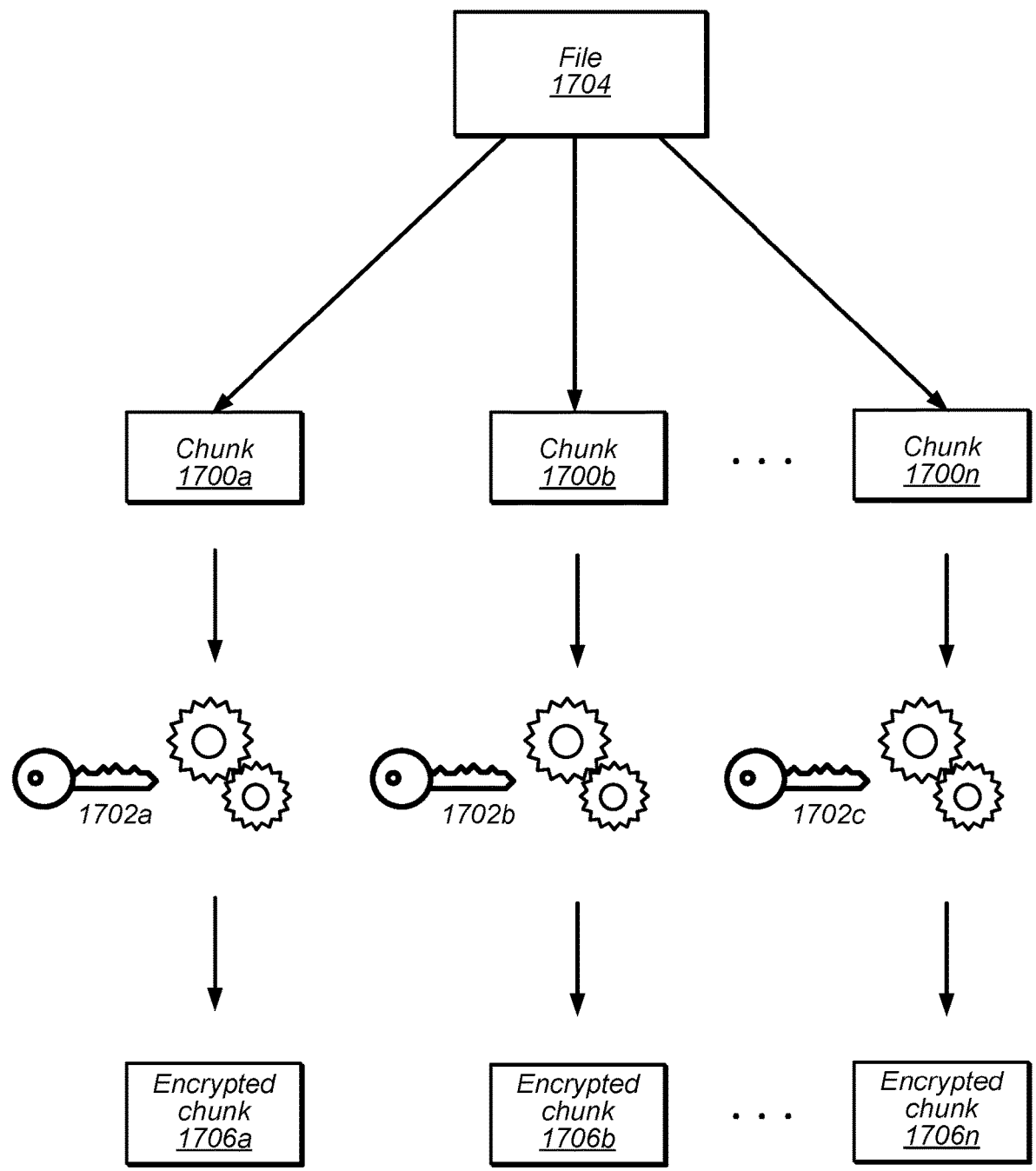
FIG. 17 illustrates a process for encrypting chunks using chunk keys, according to some embodiments.

FIG. 17 illustrates a process for encrypting chunks 1700 using chunk keys 1702, according to some embodiments. One or more portions of the illustrated process may be performed via the data transfer tool 522. The data transfer tool 522 may identify customer data 500 to be encrypted and copied to the shippable storage device 100. The identified customer data 500 may include at least one file 1704. In some embodiments, the data transfer tool 522 copies the identified customer data 500 to a virtual file system before any processing or encrypting of the customer data 500 is performed.

In some embodiments, the data transfer tool 522 divides a given file 1704 into two or more different chunks 1700. For example, the data transfer tool 522 may divide the file 1704 into n chunks 1700. In some embodiments, each chunk 1700 may be of equal size or approximately equal size (e.g., 1 megabyte, 1 gigabyte, etc.). Each chunk 1700 may include additional information identifying the file 1704 that the chunk 1700 belongs to. The additional information may also indicate what order the chunk 1700 is relative to other chunks (e.g., a sequence number), which may be used at a later point when assembling the chunks 1700 back into the file 1704.

In various embodiments, the data transfer tool 522 generates a chunk key 1702 for each chunk and each chunk 1700 is encrypted with the corresponding chunk key 1702 to create an encrypted chunk 1706. For example, chunk 1700*a* may be encrypted with chunk key 1702*a* to generate the encrypted chunk 1706*a*. In some embodiments, each of the chunk keys 1702 is different than the other chunk keys 1702. For example, the chunk key 1702*a* may be different than the chunk key 1702*b*. In other embodiments, each of the chunk keys 1702 may be the same key. Further, in some embodiments, at least two of the chunk keys 1702 are the same. For example, the chunk key 1702*a* may be the same as the chunk key 1702*b*. Thus, in some embodiments, multiple chunks 1700 may be encrypted by a particular chunk key 1702.

In some embodiments, the number of unique chunk keys 1702 that are used to encrypt the chunks 1700 of a file 1704 depend on the size of the file 1704. For example, if the file 1704 is less than a threshold size (e.g., one gigabyte), then each chunk 1700 may be encrypted by a different chunk key 1702. If the file 1704 is equal to or greater than a threshold size (e.g., one gigabyte), then a particular number of chunks 1700 may by encrypted by the each unique chunk key 1702. For example, for a file 1704 that is greater than one gigabyte in size, each unique chunk key 1702 may be used to encrypt two chunks 1700 (unless there is an odd number of chunks, in which one chunk may be encrypted by a particular key).

Furthermore, in some embodiments, any number of chunks may be assigned to each unique chunk key. In some instances, if the file 1704 is equal to or greater than a threshold size (e.g., one gigabyte), then one unique chunk key 1702 may be used to encrypt all chunks 1700 within a particular portion of the file 1704. For example, a first chunk key 1206 may be used to encrypt all chunks within the first gigabyte of the file 1704, a second chunk key 1206 may be used to encrypt all chunks within a second gigabyte of the file 1704, and a third chunk key 1206 may be used to encrypt all chunks within a third gigabyte of the file 1704 (or the remainder of the file 1704, if less than one gigabyte remains).

In some embodiments, after each chunk key 1702 encrypts a corresponding chunk 1700, the chunk key 1702 is encrypted by another key and then stored or otherwise associated with the encrypted chunk 1700. For example, the encrypted chunk key may be stored adjacent to the encrypted chunk 1700 or within a particular offset of the encrypted chunk 1700. In some embodiments, an ID associated with a chunk key 1702 and the encrypted chunk 1700 may be used to associate the chunk key 1702 with the encrypted chunk 1700, which may be useful for decrypting the encrypted chunks 1208 at a later point in time. The identifier for the file key (e.g., file key ID) that decrypts the chunk key may also be stored in association with the encrypted chunk and/or the encrypted chunk key. Therefore, in embodiments, the provision and ingestion service 520 may determine for each encrypted chunk, the corresponding chunk key for decrypting the chunk as well as the corresponding file key for decrypting the chunk key.

Furthermore, in embodiments, the encrypted chunks 1706 are organized into subsets of chunks, where each subset corresponds to a particular file 1704. In some embodiments, a file record is generated for each file 1704. The file record may include data and metadata associated with the file 1704. For example, the metadata may include a file key ID and a bucket key ID that corresponds to a particular bucket on the storage service provider 102 that the file 1704 is assigned to be imported to. Therefore, during decryption at the storage service provider, the provision and ingestion service 520 may determine for each file record, the corresponding chunks that can be assembled to form the file (e.g., by finding chunks with file key ID's that match the file key ID of the file record).

Figure 18:
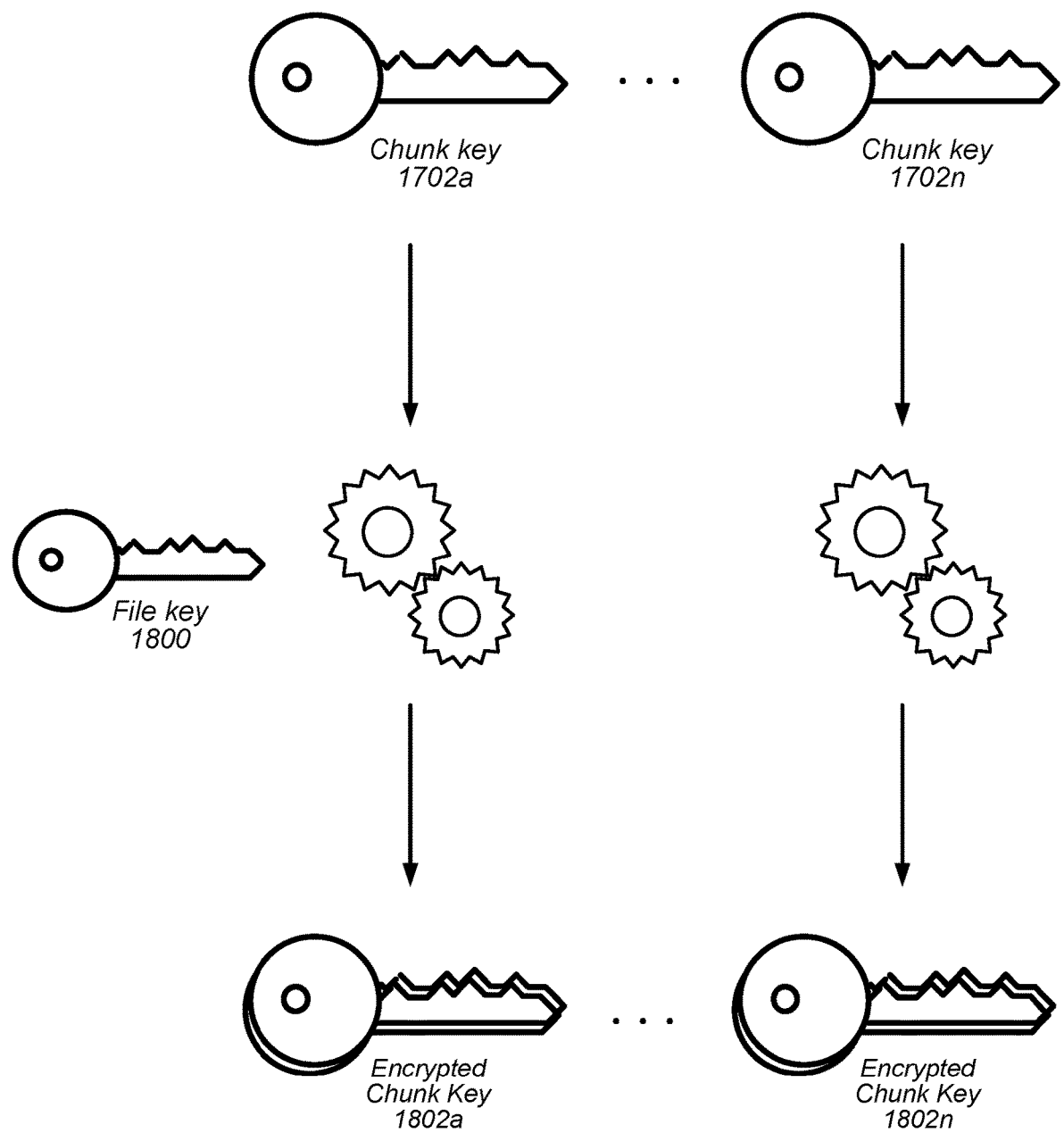
FIG. 18 illustrates a process for encrypting chunk keys using a file key, according to some embodiments.

In some embodiments, before any decryption takes place, each encrypted chunk is stored in association with (e.g., adjacent to, within a particular offset, or otherwise associated with) an encrypted chunk key that is used (in decrypted form) to decrypt the encrypted chunk. The identifier for the file key that decrypts the chunk key may also be stored in association with the encrypted chunk and/or the encrypted chunk key. Therefore, in embodiments, the provision and ingestion service 520 may determine for each encrypted chunk, the corresponding chunk key for decrypting the chunk as well as the corresponding file key for decrypting the chunk key FIG. 18 illustrates a process for encrypting chunk keys 1702 using a file key 1800, according to some embodiments. One or more portions of the illustrated process may be performed via the data transfer tool 522. In embodiments, the data transfer tool 522 generates a file key 1800 for each file 1704. Thus, the file key 1800 may be associated with the file 1704. The file key 1800 may be used to encrypt the chunk keys 1702*a* through 1702*n* to generate the encrypted chunk keys 1802*a* through 1802*n*. Further, in some embodiments, if the file 1704 is smaller than a threshold size (e.g., one gigabyte), then the file key 1800 may be used to encrypt the encrypted chunks 1706.

Figure 19:
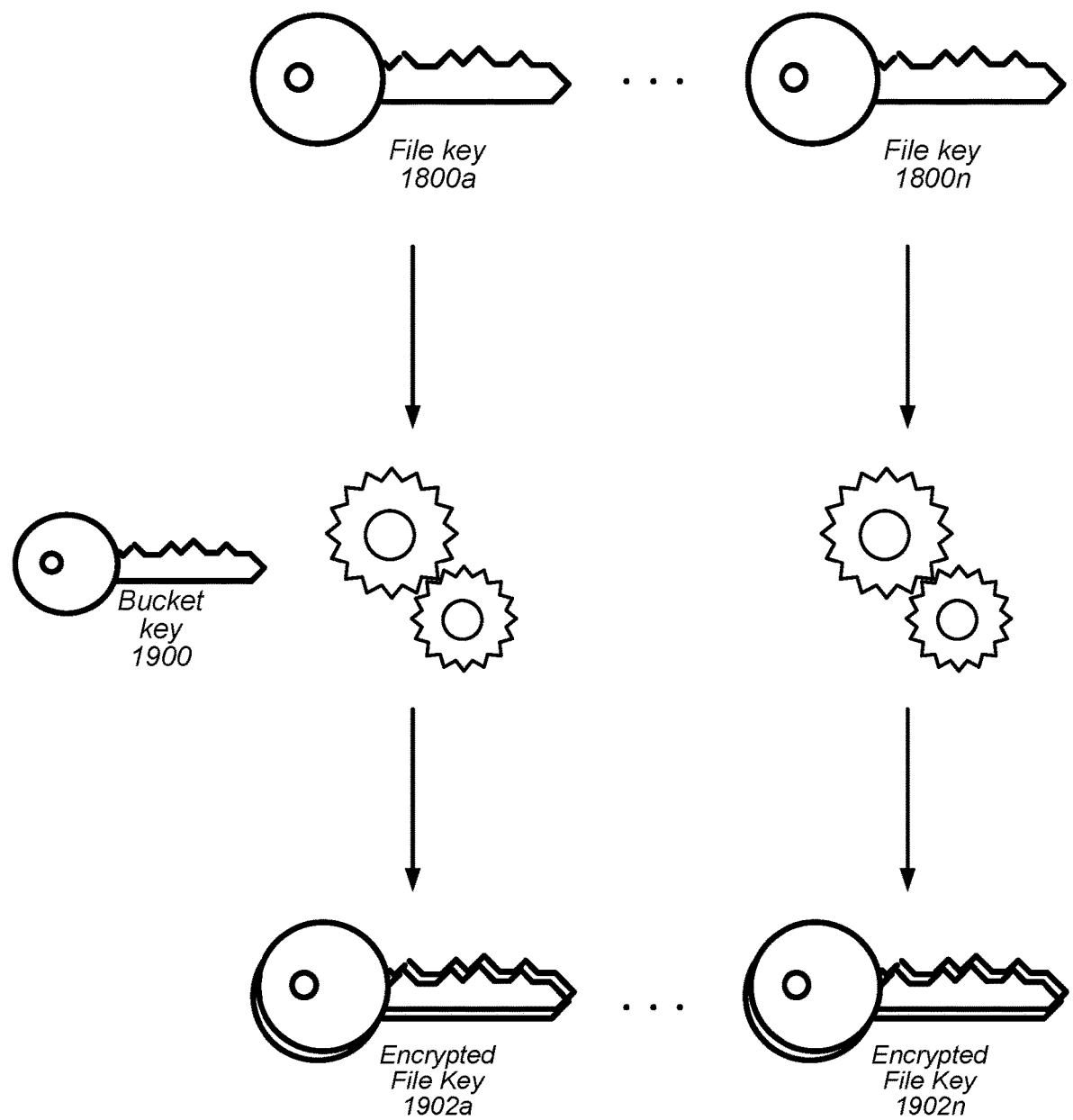
FIG. 19 illustrates a process for encrypting file keys using a bucket key, according to some embodiments.

FIG. 19 illustrates a process for encrypting file keys 1800 using a bucket key 1900, according to some embodiments. The file keys 1800*a* through 1800*n* may each be associated with corresponding files of the customer data 500 within the virtual file system. The bucket key 1900 may be obtained from the manifest 1300 and used to encrypt the file keys 1800*a* through 1800*n* to generate the encrypted file keys 1902*a* through 1902*n*.

In some embodiments, the files associated with file keys 1800*a* through 1800*n* are assigned to a particular storage location of the storage device 502 of the storage service provider 102. For example, the files associated with file keys 1800*a* through 1800*n* may be assigned to a particular bucket of the storage device 502. Further, the bucket key 1900 may also be assigned to the particular bucket. Since the file keys 1800 and the bucket key 1900 are both assigned to the same bucket, the bucket key 1900 may be used to encrypt the file keys 1800*a* through 1800*n*. Similarly, other files of customer data 500 that are to be stored in a different bucket of the storage device 502 may be encrypted with other bucket keys that correspond to the different bucket.

In some embodiments, multiple bucket keys are assigned to each bucket. Therefore, some files destined for storage at a particular bucket may be encrypted with a first bucket key associated with the particular bucket while other files destined for storage at the same bucket may be encrypted with a second bucket key associated with the particular bucket. In various embodiments, any number of bucket keys may be assigned to each bucket (e.g., 2, 10, etc.).

Figure 20:
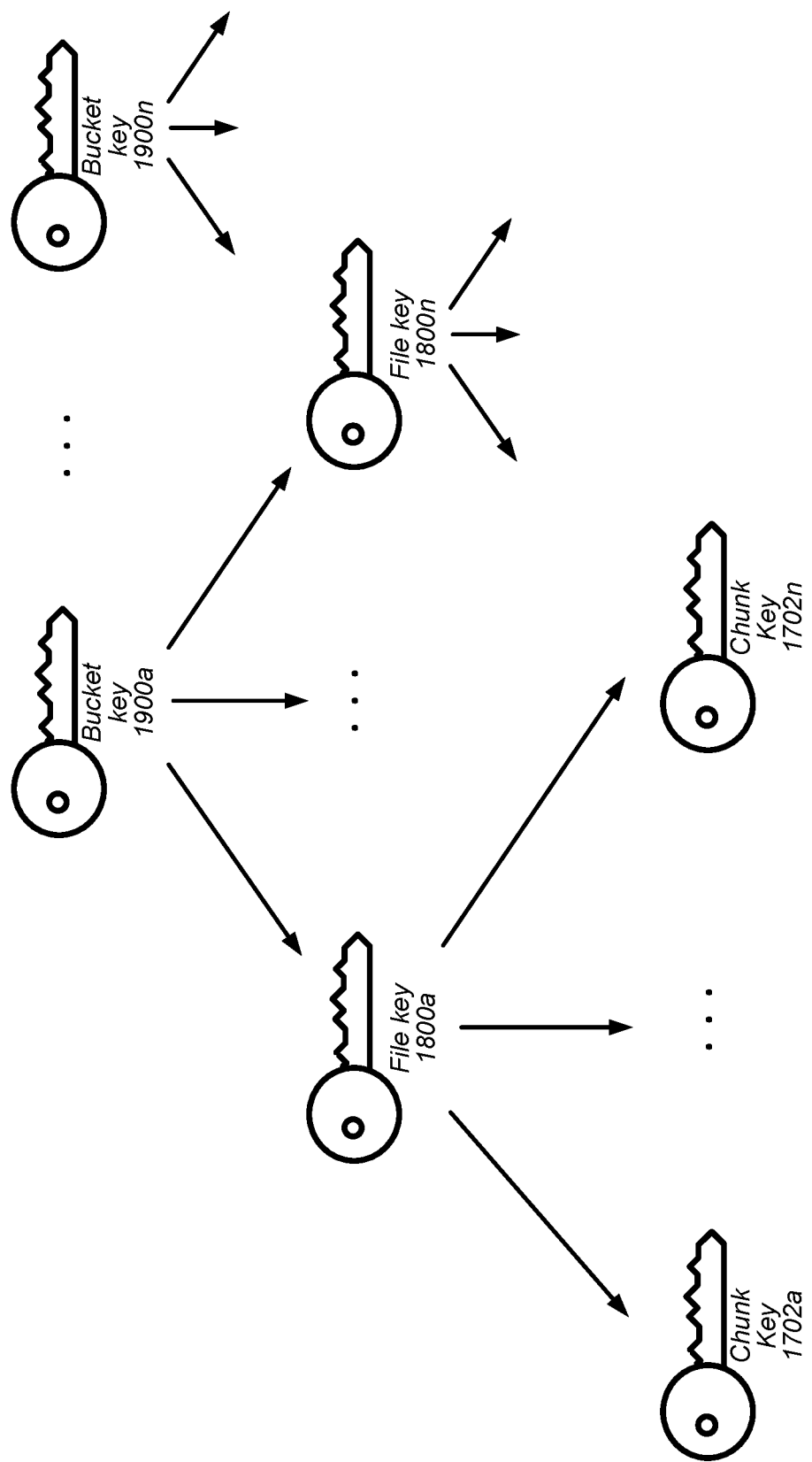
FIG. 20 is a logical block diagram of relationship between encryption keys associated with a data import job, according to some embodiments.

FIG. 20 is a logical block diagram of relationship between encryption keys associated with a data import job, according to some embodiments. In some embodiments, one or more location keys are obtained from the manifest 1300, wherein each location key corresponds to a location for storing data on the storage device 502 of the storage service provider 102. For example, bucket keys 1900a-n may be obtained from the manifest 1300. The bucket keys 1900a-n may also be stored in a secure location of the data storage provider 102, such as key data 506.

In some embodiments, each bucket key 1900 is used to encrypt one or more file keys 1800a-n. In some instances, the one or more file keys 1800a-n are generated at the customer network 104, such as by the data transfer tool 522. In some embodiments, at least some of the one or more file keys 1800a-n are obtained from the storage service provider 102, such as via the manifest 1300.

In some instances, each file key 1800 is used to encrypt one or more chunk keys 1700a-n. As discussed above, in some embodiments, one or more additional intermediate levels of file keys 1800 may be used to add extra levels of encryption in between the bucket keys 1900 and the chunk keys 1702. In some instances, the one or more chunk keys 1700a-n are generated at the customer network 104, such as by the data transfer tool 522. In some embodiments, at least some of the one or more chunk keys 1700a-n are obtained from the storage service provider 102, such as via the manifest 1300.

Figure 21:
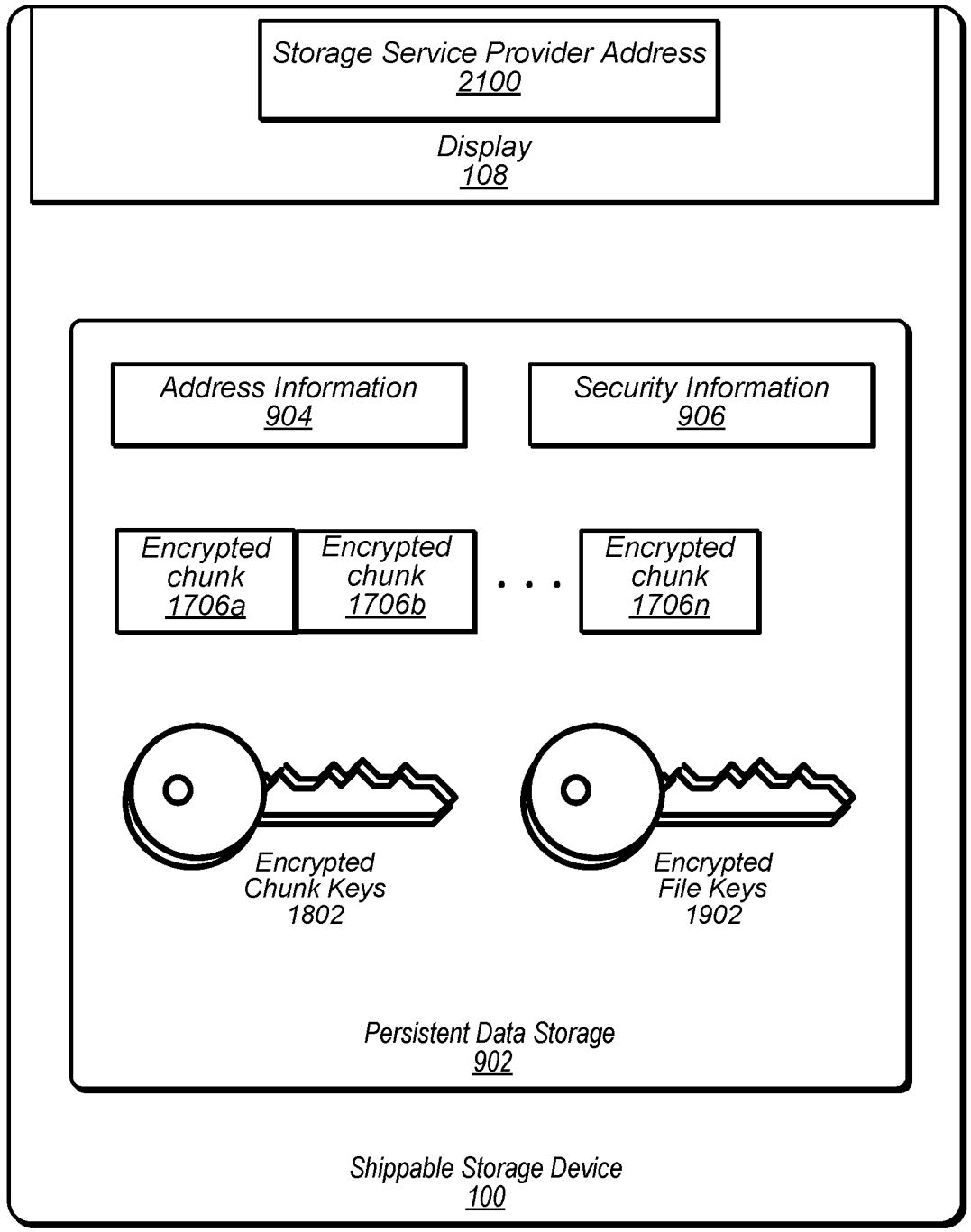
FIG. 21 is a logical block diagram of a shippable storage device ready for shipping to a storage service provider, according to some embodiments.

FIG. 21 is a logical block diagram of a shippable storage device 100 ready for shipping to a storage service provider 102, according to some embodiments. After the data transfer tool 522 completes encryption of the customer data 500 and encryption keys, the data transfer tool 522 may transfer the encrypted chunks 1706, the encrypted chunk keys 2102, and the encrypted file keys 2104 from the virtual file system to the persistent data storage 902 of the shippable storage device 100.

In various embodiments, the persistent data storage 902 may also include additional data such as the address information 904 and the security information 906, as described above for FIG. 9. The display 108 may also display the storage server provider address 2200, obtained from the address information 904. For example, in response to receiving the encrypted chunks 1706, the encrypted chunk keys 2102, and the encrypted file keys 2104, the shippable storage device 100 may display the address of the storage service provider 102 on the display 108. In some instances, the data transfer tool 522 may send the storage server provider address 2200 to the shippable storage device 100 for the display 108.

Since there is no key stored on the shippable storage device 100 for decrypting the encrypted chunks 1902 or the encrypted keys, a third party that somehow obtains the device during transit and accesses the persistent data storage 902 may be unable to decrypt the encrypted chunks 1706, the encrypted chunk keys 2102, and the encrypted file keys 2104. In some embodiments, some or all of the other data within the persistent data storage 902 is also encrypted. For example, the data transfer tool 522 may copy/remove any of the other data including the address information 706, the security information 708, or other information from the shippable storage device 100, encrypt the data (e.g., with a bucket key 1900 or another key), then store the encrypted data on the storage device 100. In some instances, at least some portions of the address information and/or security information may remain in clear text form. For example, the address information may be stored in clear text form in order for the destination address to be displayed on the display 108.

Figure 22:
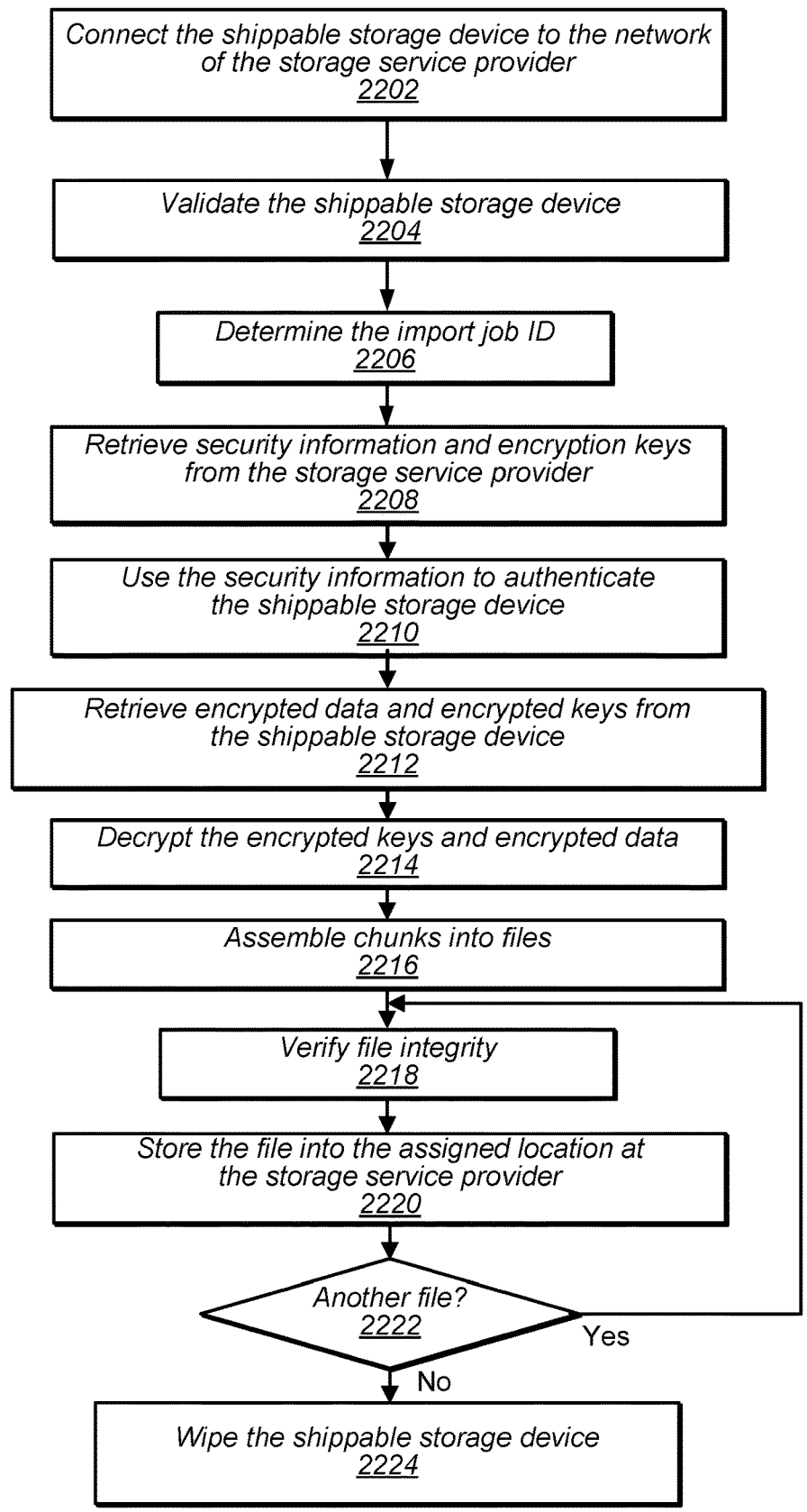
FIG. 22 is a flow diagram of a process for receiving a shippable storage device at a storage service provider and ingesting secure data from the shippable storage device, according to some embodiments.

FIG. 22 is a flow diagram of a process for receiving a shippable storage device 100 at a storage service provider 102 and ingesting secure data from the shippable storage device 100, according to some embodiments. One or more portions of the illustrated process may be performed by the storage service provider 102, such as by the provision and ingestion service 520 and/or other services.

Furthermore, in some embodiments, the storage service provider 102 retrieves the encrypted data and keys from two or more shippable storage devices 100. For example, the processes of FIGS. 22, 23, and/or 24 may be performed for two or more shippable storage devices, in serial or concurrently in parallel. When performing any of the processes in parallel for two or more shippable storage devices 100, the amount of time required to import data into the storage service provider 102 may be reduced, compared to importing the same data serially or by using just one shippable storage device 100.

In some embodiments, two or more shards may be shipped to the storage service provider 102 on two or more corresponding shippable storage devices 100, as described for FIG. 16. After the provision and ingestion service 520 receives and decrypts all of the shards from each of the two or more corresponding shippable storage devices 100, the provision and ingestion service 520 may then reconstitute the data 500 to be imported into the storage service provider 102.

At block 2202, after receiving and inspecting the shippable storage device 100, a user at the storage service provider connects the shippable storage device 100 to a network of the storage service provider 102. In some embodiments, the shippable storage device 100 is inspected visually to determine that the shippable storage device 100 was not tampered with or damaged. In embodiments, the shippable storage device 100 may also be scanned or otherwise inspected using one or more technologies that may not require physical contact with the device.

After the shippable storage device 100 passes a visual and/or physical inspection, the device may be connected to the network. In some instances, a guard service of the storage service provider 102 communicates with the device after connection. The guard service may be running on a network that is logically and/or physically separate from one or more other networks of the storage service provider 102 in order to prevent a possible network attack or software attack, such as from a software virus. In some embodiments, the storage service provider 102 may identify the shippable storage device 100 based on obtaining a device ID or other information from the shippable storage device 100.

At block 2204, the storage service provider 102 validates the shippable storage device 100. In some embodiments, the storage service provider 102 determines whether the configuration has changed since the shippable storage device 100 was configured, provisioned, and shipped from the storage service provider 102. In some instances, the storage service provider 102 determines whether the configuration has changed since the shippable storage device 100 was configured and shipped from the customer to the storage service provider 102. The configuration of the shippable storage device 100 may include one or more of a physical configuration of one or more components, a firmware configuration, an operating system configuration, and other software configuration.

In some embodiments, the storage service provider 102 determines whether the configuration of the shippable storage device 100 has changed at least in part by communicating with the TPM 360 and analyzing data obtained from the TPM 360. The data obtained from the TPM 360 may indicate, based on the analysis, that the shippable storage device 100 was tampered with and/or that a third party may have accessed data on the shippable storage device 100.

If the storage service provider 102 determines that the configuration of the shippable storage device 100 has changed, then the storage service provider 102 may wipe the shippable storage device 100. In some embodiments, the storage service provider 102 indicates that processing of the shippable storage device 100 is to be put on hold and await inspection.

At block 2206, the storage service provider 102 determines the data import job associated with the shippable storage device 100. In some embodiments, the storage service provider 102 may determine an import job ID (or other import job identifier) for the shippable storage device 100 based on obtaining a device ID (e.g. a mac address specific to the shippable storage device 100) from the shippable storage device 100. The storage service provider 102 may have database or other storage records that associate the particular import job (e.g., via a job ID) with the mac address. In some embodiments, the storage service provider 102 determines the data import job associated with the shippable storage device 100 based on the security information 906.

At block 2208, in response to determining the data import job associated with the shippable storage device 100, the storage service provider 102 retrieves security information and encryption keys (e.g., bucket keys assigned to the customer) associated with the identified data import job from one or more storage location of the storage service provider 102, such as key data 506 and metadata 508. In some instances, additional the storage service provider 102 may retrieve additional data associated with the data import job. In some embodiments, the storage service provider 102 may have database or other storage records that associate the import job ID and/or the device ID with the security information 708 for authenticating the shippable storage device 100 as well as encryption keys that were used for encrypting data on the shippable storage device 100, such as the bucket keys 1900. In some embodiments, the security information retrieved from the storage service provider 102 includes a root certificate or key that can be used to authenticate the shippable storage device 100.

In some embodiments, the storage service provider 102 may retrieve at least some of the file keys 1502 and/or at least some of the chunk keys 1206 that were generated by the data transfer tool 522 from a storage location of the storage service provider 102. For example, in some embodiments, the data transfer tool 522 may transmit at least some of the generated file keys 1502 and/or the generated chunk keys 1206 to the storage service provider 102 instead of encrypting them and storing them on the shippable storage device.

At block 2210, the storage service provider 102 uses the retrieved security information to authenticate the shippable storage device 100. For example, the storage service provider 102 may authenticate the shippable storage device 100 based on a root certificate or key found in the security information and a corresponding root certificate or key stored on the shippable storage device 100. In embodiments, the shippable storage device 100 may perform a similar authentication, so that the storage service provider 102 and the shippable storage device 100 mutually authenticate.

In embodiments, the security information 906 on the shippable storage device 100 includes a certificate which includes one part of an asymmetric key, and the security information of the 1302 manifest 1300 includes the other part of the asymmetric key. Thus, the authentication may be based on a public-private key pair. In some embodiments, the security information 906 on the shippable storage device 100 includes both a public and a private key and the security information of the 1302 manifest 1300 includes a corresponding private and a corresponding public key that allows for the mutual authentication. In embodiments, the certificate used for authentication is specific to the particular data import job that the shippable storage device 100 is being used for. In embodiments, if the data transfer tool 522 is unable to authenticate the shippable storage device 100 based on the certificate, then the data transfer tool 522 is unable to transfer any encrypted or unencrypted data to the shippable storage device.

In some embodiments, in response to authenticating the shippable storage device 100 and verifying that the shippable storage device 100 does not have any malicious code, the storage service provider 102 may switch from using the guard service to using the provision and ingestion service 520 to communicate with the shippable storage device 100.

At block 2212, the storage service provider 102 retrieves the encrypted data and keys from the shippable storage device 100. For example, storage service provider 102 may retrieve the encrypted chunks 1706, the encrypted chunk keys 2102, and the encrypted file keys 2104 from the shippable storage device 100. In some embodiments, the provision and ingestion service 520 receives and transmits data to the shippable storage device 100. The provision and ingestion service 520 may also communicate with the job orchestrator 514 and the metadata service 512 to obtain information for retrieving data and organizing data from the shippable storage device 100.

In some embodiments, the encrypted chunks 1706, the encrypted chunk keys 2102, and the encrypted file keys 2104 are copied to a memory of the storage service provider 102, such as volatile and/or non-volatile memory associated with the provision and ingestion service 520, before being decrypted/imported. In various embodiments, the provision and ingestion service 520 retrieves portions of the encrypted data and keys from the shippable storage device 100 at a time, where each portion is separately decrypted and imported before retrieving the next portion. For example, the provision and ingestion service 520 may retrieve data in individual chunks, groups of chunks, keys, groups of keys, or any other suitable portion and/or category.

At block 2214, the storage service provider 102 decrypts the encrypted keys and data. For example, the provision and ingestion service 520 may decrypt the encrypted chunks 1706, the encrypted chunk keys 2102, and the encrypted file keys 2104. The decryption process is described in more detail in FIG. 24.

At block 2216, the storage service provider 102 assembles the decrypted chunks into files. In some embodiments, the provision and ingestion service 520 may use metadata from the decrypted chunks to assemble the chunks into files. For example, the metadata may indicate that a subset of the chunks belong to a particular file. The metadata may also indicate a sequential order of the chunks for assembling back into the particular file.

At block 2218, the storage service provider 102 the file integrity of a file. For example, the provision and ingestion service 520 may retrieve a checksum for a particular file from the metadata service 512 (which may have been previously calculated and transmitted to the storage service provider 102 by the data transfer tool 522), calculate a checksum for the particular file that was assembled, and then compare the retrieved checksum to the calculated checksum. If the comparison indicates a match, then the provision and ingestion service 520 may verify the integrity of the file data.

At block 2220, in response to verifying the integrity of the file data, the storage service provider 102 stores the file in a bucket that the file is assigned to. For example, the provision and ingestion service 520 may store the file in a particular bucket within the storage device 502 of the storage service provider 102.

At block 2222, the storage service provider 102 determines whether there is another file to process for the data import job. If the storage service provider 102 determines that there is another file to process, then the process returns to block 2218. If the storage service provider 102 determines that there are no more files to process for the import job, then the process proceeds to block 2224.

In some embodiments, two or more shards are received and decrypted by the storage service provider 102. A shard may be decrypted as a single file or multiple files, depending on how the shards were encrypted. The data 500 to import may be reconstructed from the two or more shards and imported into the storage service provider 102. The two or more shards may be retrieved from one or multiple shippable storage devices 100.

At block 2224, the storage service provider 102 wipes the shippable storage device 100. In some embodiments, the provision and ingestion service 520 erases data and operating software from the shippable storage device 100. The shippable storage device 100 may then be disconnected from the network and moved to a storage area for wiped devices that are ready to be provisioned. In some embodiments, the shippable storage device 100 remains connected to the network so that it can be provisioned for another data import job for the same customer or another customer.

Figure 23:
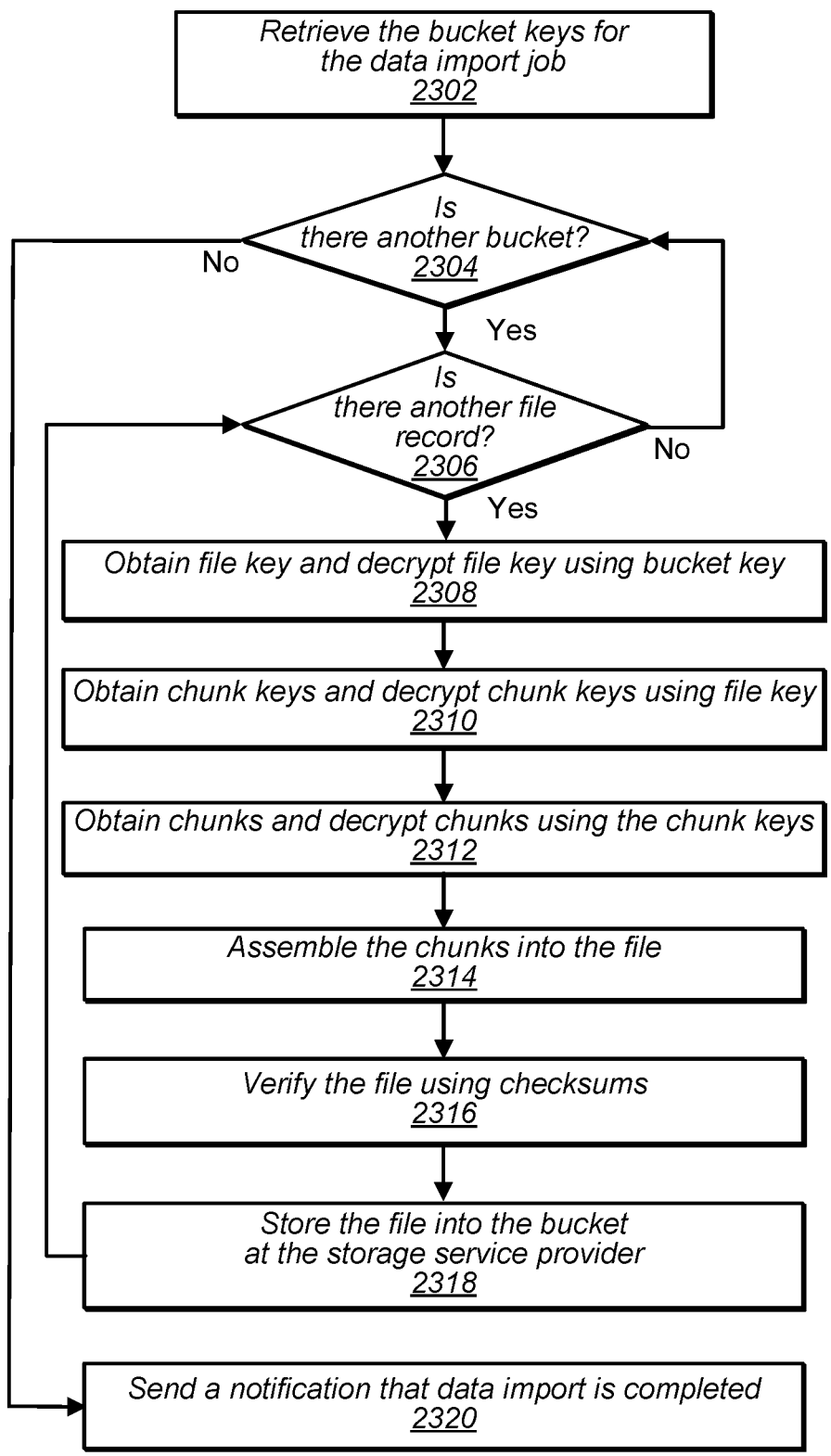
FIG. 23 is a flow diagram of a process for decrypting and importing data from a shippable storage device at a storage service provider, according to some embodiments.

FIG. 23 is a flow diagram of a process for decrypting and importing data from a shippable storage device 100 at a storage service provider 102, according to some embodiments. One or more portions of the illustrated process may be performed by one or more services of the storage service provider 102, such as by the provision and ingestion service 520 and/or other services.

In some embodiments, the decryption of the keys and data may be performed on subsets of the encrypted keys and/or encrypted data at a time, after transferring each respective subset of the encrypted keys and/or encrypted data to volatile and/or non-volatile memory of the storage service provider 102, such as memory associated with the provision and ingestion service 520. For example, as illustrated below, an encrypted file key for a particular file and encrypted chunks for the particular file may be transferred from the shippable storage device 100 to the data storage provider 102, the associated data may be decrypted and/or imported, then the provision and ingestion service 520 may repeat the process for each additional file. In some embodiments, the provision and ingestion service 520 may transfer all or a substantial portion of the encrypted data and keys from the shippable storage device 100 to the data storage provider 102 and then perform the decryption and/or importing of the data. In various embodiments, any other suitable subset of keys and/or data may be transferred at a time from the shippable storage device 100 to the data storage provider 102 for processing (e.g., decryption of keys and chunks, assembling chunks into a file, verifying file, storing file, etc.).

At block 2302, the storage service provider 102 retrieves the bucket keys 1900 from a storage location of the storage service provider 102 based on determining the data import job associated with the shippable storage device 100. For example, the provision and ingestion service 520 may obtain a mac address, import job ID, or other identifier from the shippable storage device 100 and retrieve the bucket keys 1900 from key data 506 based on the mac address, job ID, or other identifier matching one or more records stored by the storage service provider 102. In some embodiments, the provision and ingestion service 520 may also retrieve one or more other keys or data associated with the data import job.

At block 2304, the provision and ingestion service 520 determines whether there is another bucket (e.g. a particular logical and/or physical storage location for one or more files) that will be used to store data imported from the shippable storage device 100. In some embodiments, this may include determining whether there is another bucket ID (or other location identifier) stored on the shippable storage device 100. If the provision and ingestion service 520 determines there is another bucket, then the process continues to block 2306 to continue processing the file for the current bucket. If the provision and ingestion service 520 determines there is not another bucket, then the process continues to block 2320, where the storage service provider 102 may send a notification to one or more other services and/or devices that the data import for the data import job is complete.

At block 2306, the provision and ingestion service 520 determines whether there is another file record (e.g. file data and metadata associated with the file) associated with the bucket identified in block 2304. In some embodiments, this includes determining if any more of the remaining file records (e.g., stored on the shippable storage device) include a bucket key ID that matches the bucket currently being processed (determined at block 2304). If the provision and ingestion service 520 determines there is another file record, then the process continues to block 2308. If the provision and ingestion service 520 determines there is not another file record, then the process returns to block 2304, where the storage service provider 102 determines whether there is data associated with another bucket that is to be imported for the data import job. In some embodiments, a file record may include an encrypted file key that may be used in unencrypted form to decrypt bucket keys associated with the file key, and a bucket key identifier that identifies the bucket key associated with the bucket that the file will be stored in.

At block 2308, the provision and ingestion service 520 obtains the encrypted file key of the file record (determined at block 2306) and decrypts the encrypted file key using the bucket key (obtained at block 2302) associated with the bucket (determined at block 2304). In some embodiments, the provision and ingestion service 520 determines that the file record identifies a particular bucket key (and associated bucket) that was retrieved at block 2302. Therefore, the provision and ingestion service 520 may use the identified bucket key to decrypt the file key of the file record.

At block 2310, the provision and ingestion service 520 obtains chunk keys for the file and decrypts each of the chunk keys using the file key decrypted at block 2308. At block 2312, the provision and ingestion service 520 obtains the chunks for the file and decrypts each of the chunks with a corresponding chunk key obtained at block 2310. For example, each chunk key may be associated with a different chunk key that is used to decrypt the particular chunk.

In some embodiments, before any decryption takes place, each encrypted chunk is stored in association with (e.g., adjacent to, within a particular offset, or otherwise associated with) an encrypted chunk key that is used (in decrypted form) to decrypt the encrypted chunk. The identifier for the file key that decrypts the chunk key may also be stored in association with the encrypted chunk and/or the encrypted chunk key. Therefore, in embodiments, the provision and ingestion service 520 may determine for each encrypted chunk, the corresponding chunk key for decrypting the chunk as well as the corresponding file key for decrypting the chunk key.

At block 2312, the provision and ingestion service 520 obtains the chunks for the file and decrypts each of the chunks using the corresponding chunk key (decrypted at block 2310). In some embodiments, the provision and ingestion service 520 determines which chunk key is used to decrypt a particular chunk based at least on metadata associated with the chunk and/or the chunk key. In some embodiments, the provision and ingestion service 520 determines which chunk key is used to decrypt a particular chunk based at least on a storage location of a chunk key with respect to a storage location of the particular chunk.

At block 2314, the provision and ingestion service 520 assembles the chunks 1700 into the. In some embodiments, the provision and ingestion service 520 may assemble the chunks into the file based at least on metadata associated with each chunk (e.g., sequence number and/or order with respect to other chunks). In some instances, the provision and ingestion service 520 may assemble the chunks into the file based at least on a storage location of each chunk relative to one or more other chunks. At block 2316, the provision and ingestion service 520 verifies the file using checksums, as described above. At block 2318, the provision and ingestion service 520 stores the file into the bucket at the storage service provider 102. The process then returns to block 2306, where the provision and ingestion service 520 determines whether there is another file record for the bucket.

Figure 24:
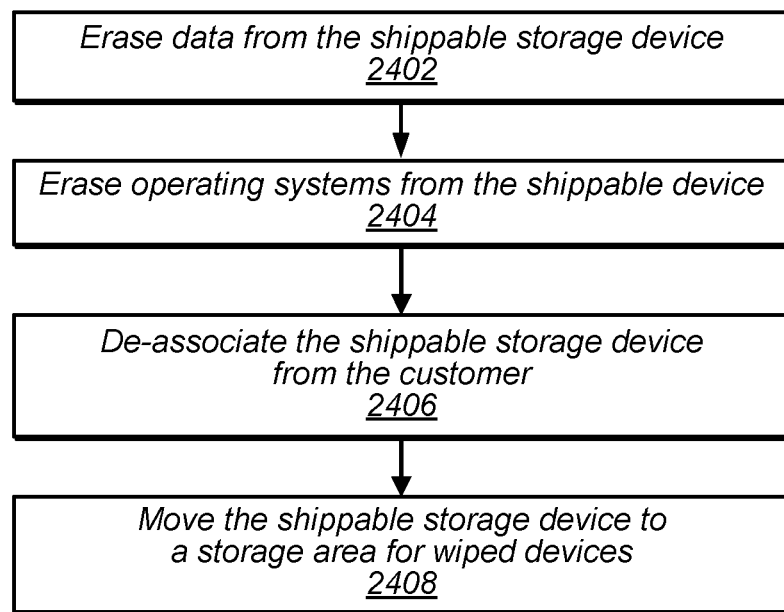
FIG. 24 is a flow diagram of a process for wiping a shippable storage device at a storage service provider, according to some embodiments.

FIG. 24 is a flow diagram of a process for wiping a shippable storage device 100 at a storage service provider 102, according to some embodiments. One or more portions of the illustrated process may be performed by one or more services of the storage service provider, such as the provision and ingestion service 520 and/or other services.

At block 2402, the storage service provider 102 erases data from the shippable storage device 100. For example, the storage service provider 102 may erase data from the persistent data storage 902.

At block 2404, the storage service provider 102 erases operating software from the shippable storage device 100. For example the storage service provider 102 may the erase operating system and servers from the persistent data storage 902.

At block 2406, the storage service provider 102 de-associates the shippable storage device 100 from the customer. For example, the storage service provider 102 may remove one or more records associating the customer or customer network 104 with the shippable storage device 100. At block 2408, the storage service provider 102 moves the shippable storage device 100 to a storage area for wiped shippable storage devices 100. In some embodiments, the shippable storage device 100 may remain attached to the network and await provision for a new data import job.

Figure 25:
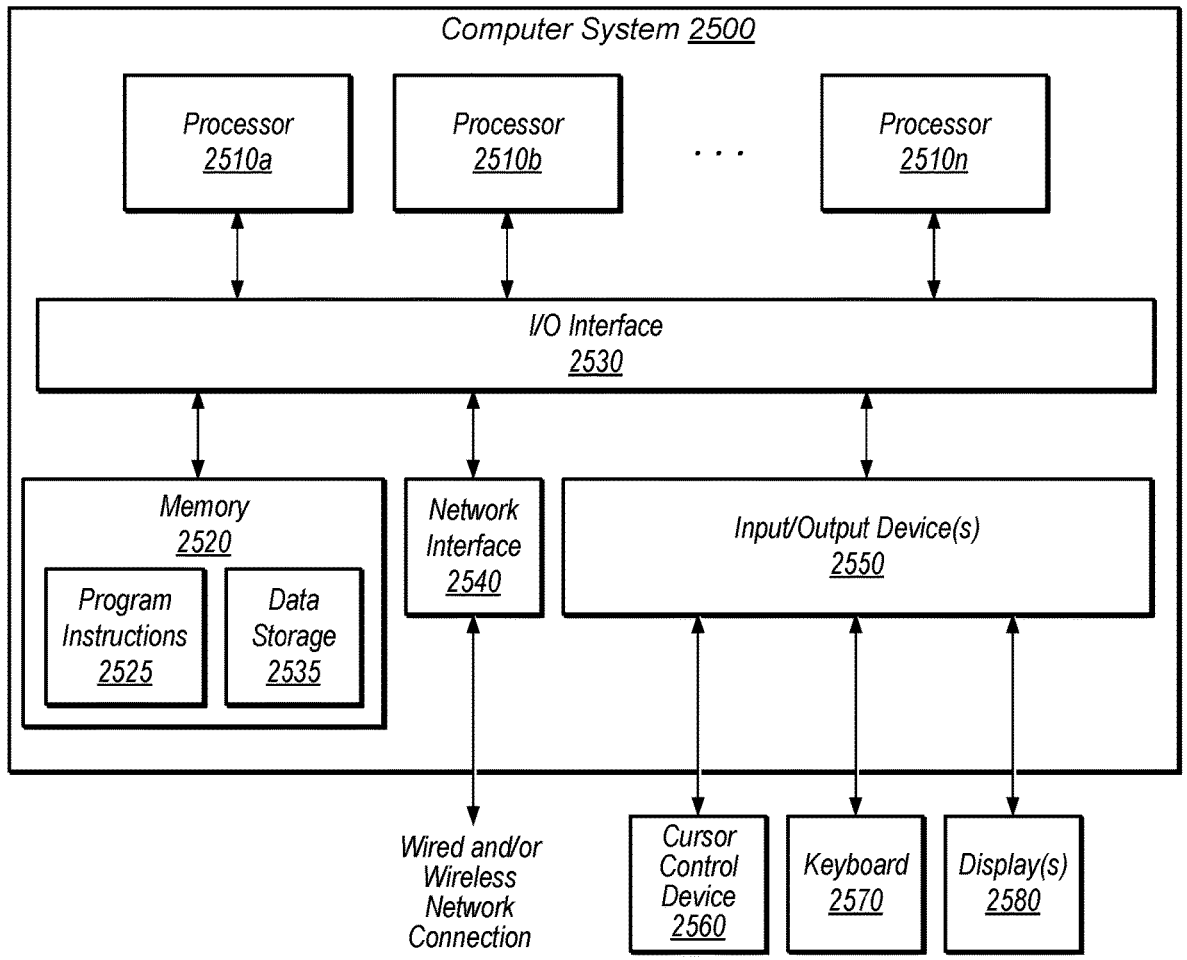
FIG. 25 is a block diagram illustrating an example computer system that implements some or all of the techniques described herein, according to some embodiments.

Any of various computer systems may be configured to implement the processes associated (e.g., provisioning or ingestion by the service provider or execution of the downloaded application on a customer server) with a shippable storage device. For example, FIG. 25 is a block diagram illustrating one embodiment of a computer system suitable for implementing some of the systems and methods described herein. In various embodiments, the storage service provider 102, or customer computers at the customer network 104 (e.g., customer device 504 or computing device 1102) may each include a computer system 2500 such as that illustrated in FIG. 25.

In the illustrated embodiment, computer system 2500 includes one or more processors 2510 coupled to a system memory 2520 via an input/output (I/O) interface 2530. Computer system 2500 further includes a network interface 2540 coupled to I/O interface 2530. In some embodiments, computer system 2500 may be illustrative of servers implementing enterprise logic or downloadable application, while in other embodiments servers may include more, fewer, or different elements than computer system 2500.

In various embodiments, computer system 2500 may be a uniprocessor system including one processor 2510, or a multiprocessor system including several processors 2510 (e.g., two, four, eight, or another suitable number). Processors 2510 may be any suitable processors capable of executing instructions. For example, in various embodiments, processors 2510 may be embedded processors implementing any of a variety of instruction set architectures (ISAs), such as the x106, PowerPC, SPARC, or MIPS ISAs, or any other suitable ISA. In multiprocessor systems, each of processors 2510 may commonly, but not necessarily, implement the same ISA.

System memory 2520 may be configured to store instructions and data accessible by processor 2510. In various embodiments, system memory 2520 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the service provider or downloadable software are shown stored within system memory 2520 as program instructions 2525. In some embodiments, system memory 2520 may include data 2535 which may be configured as described herein.

In one embodiment, I/O interface 2530 may be configured to coordinate I/O traffic between processor 2510, system memory 2520 and any peripheral devices in the system, including through network interface 2540 or other peripheral interfaces. In some embodiments, I/O interface 2530 may perform any necessary protocol, timing or other data transformations to convert data signals from one component (e.g., system memory 2520) into a format suitable for use by another component (e.g., processor 2510). In some embodiments, I/O interface 2530 may include support for devices attached through various types of peripheral buses, such as a variant of the Peripheral Component Interconnect (PCI) bus standard or the Universal Serial Bus (USB) standard, for example. In some embodiments, the function of I/O interface 2530 may be split into two or more separate components, such as a north bridge and a south bridge, for example. Also, in some embodiments, some or all of the functionality of I/O interface 2530, such as an interface to system memory 2520, may be incorporated directly into processor 2510.

Network interface 2540 may be configured to allow data to be exchanged between computer system 2500 and other devices attached to a network, such as other computer systems, for example. In particular, network interface 2540 may be configured to allow communication between computer system 2500 and/or various I/O devices 2550. I/O devices 2550 may include scanning devices, display devices, input devices and/or other communication devices, as described herein. Network interface 2540 may commonly support one or more wireless networking protocols (e.g., Wi-Fi/IEEE 802.11, or another wireless networking standard). However, in various embodiments, network interface 2540 may support communication via any suitable wired or wireless general data networks, such as other types of Ethernet networks, for example. Additionally, network interface 2540 may support communication via telecommunications/telephony networks such as analog voice networks or digital fiber communications networks, via storage area networks such as Fibre Channel SANs, or via any other suitable type of network and/or protocol.

In some embodiments, system memory 2520 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 2500 via I/O interface 2530. A computer-readable storage medium may also include any volatile or non-volatile media such as RAM (e.g. SDRAM, DDR SDRAM, RDRAM, SRAM, etc.), ROM, etc., that may be included in some embodiments of computer system 2500 as system memory 2520 or another type of memory. Further, a computer-accessible medium may include transmission media or signals such as electrical, electromagnetic, or digital signals, conveyed via a communication medium such as a network and/or a wireless link, such as may be implemented via network interface 2540.

In some embodiments, I/O devices 2550 may be relatively simple or "thin" client devices. For example, I/O devices 2550 may be configured as dumb terminals with display, data entry and communications capabilities, but otherwise little computational functionality. However, in some embodiments, I/O devices 2550 may be computer systems configured similarly to computer system 2500, including one or more processors 2510 and various other devices (though in some embodiments, a computer system 2500 implementing an I/O device 2550 may have somewhat different devices, or different classes of devices).

In various embodiments, I/O devices 2550 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 2550 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 2500. In general, an I/O device 2550 (e.g., cursor control device, keyboard, or display(s) may be any device that can communicate with elements of computing system 2500.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
   one or more computing devices of a network of a client site;
   one or more storage devices of the network of the client site;
   a plurality of shippable storage devices, wherein the plurality of shippable storage devices are attached to the network of the client site; and
   a data transfer tool implemented on at least one of the one or more computing devices of the client site, wherein the data transfer tool is configured to:
   identify data stored on the one or more storage devices to be imported by a remote storage provider;
   apply a redundancy encoding technique on the identified data to generate a plurality of shards; and
   transfer different shards of the plurality of shards to different ones of the plurality of shippable storage devices prior to shipment of the plurality of shippable storage devices for import of the identified data by the remote storage provider.

2. The system as recited in claim 1, wherein to transfer the different shards to the different ones of the plurality of shippable storage devices, the data transfer tool is further configured to:
   transfer the different shards to the different ones of the plurality of shippable storage devices in parallel.

3. The system as recited in claim 1, wherein the data transfer tool is further configured to:
   prior to the transfer of the different shards, encrypt the different shards using one or more encryption keys.

4. The system as recited in claim 3, wherein the data transfer tool is further configured to:

generate the one or more encryption keys or obtain the one or more encryption keys from another data source.

5. The system as recited in claim 4, wherein the data transfer tool is further configured to:
   encrypt the one or more encryption keys using at least one encryption key to generate an encrypted one or more encryption keys to be communicated to the remote storage provider.

6. The system as recited in claim 5, wherein the data transfer tool is further configured to:
   obtain the at least one encryption key from the remote storage provider separate from the plurality of shippable storage devices, or
   provide the at least one encryption key from the client site to the remote storage provider separate from the plurality of shippable storage devices.

7. A method, comprising:
   performing, by a data transfer tool implemented on one or more computing devices of a network of a client site:
   identifying data stored on one or more storage devices of the client site to be imported by a remote storage provider;
   applying a redundancy encoding technique on the identified data to generate a plurality of shards; and
   transferring different shards of the plurality of shards to different ones of a plurality of shippable storage devices prior to shipment of the plurality of shippable storage devices for import of the identified data by the remote storage provider, wherein the plurality of shippable storage devices are attached to the network of the client site.

8. The method as recited in claim 7, wherein transferring the different shards to the different ones of the plurality of shippable storage devices comprises:
   transferring the different shards to the different ones of the plurality of shippable storage devices in parallel.

9. The method as recited in claim 7, further comprising:
   prior to the transfer of the different shards, encrypting the different shards using one or more encryption keys.

10. The method as recited in claim 9, further comprising:
    encrypting the one or more encryption keys using at least one encryption key to generate an encrypted one or more encryption keys to be communicated to the remote storage provider.

11. The method as recited in claim 10, further comprising:
    obtaining the at least one encryption key from the remote storage provider separate from the plurality of shippable storage devices, or
    providing the at least one encryption key from the client site to the remote storage provider separate from the plurality of shippable storage devices.

12. The method as recited in claim 10, further comprising:
    transferring the encrypted one or more encryption keys to the plurality of shippable storage devices or transmitting the encrypted one or more encryption keys to the storage provider via a communication network, separate from the plurality of shippable storage devices.

13. The method as recited in claim 8, further comprising:
    subsequent to completion of the transferring of at least one of the different shards to at least one of the plurality of shippable storage devices, indicating that the at least one shippable storage device is ready for shipment to the remote storage provider.

14. One or more non-transitory computer-accessible storage media storing program instructions that when executed on or across one or more computing devices of a network of a client site cause the one or more computing devices to implement a data transfer tool to:
    identify data stored on one or more storage devices of the client site to be imported by a remote storage provider;
    apply a redundancy encoding technique on the identified data to generate a plurality of shards; and
    transfer different shards of the plurality of shards to different ones of a plurality of shippable storage devices prior to shipment of the plurality of shippable storage devices for import of the identified data by the remote storage provider, wherein the plurality of shippable storage devices are attached to the network of the client site.

15. The one or more storage media as recited in claim 14, wherein to transfer the different shards to the different ones of the plurality of shippable storage devices, the program instructions when executed further cause the one or more computing devices to implement the data transfer tool to:
    transfer the different shards to the different ones of the plurality of shippable storage devices in parallel.

16. The one or more storage media as recited in claim 14, wherein the program instructions when executed further cause the one or more computing devices to implement the data transfer tool to:
    prior to the transfer of the different shards, encrypt the different shards using one or more encryption keys.

17. The one or more storage media as recited in claim 16, wherein the program instructions when executed further cause the one or more computing devices to implement the data transfer tool to:
    encrypt the one or more encryption keys using at least one encryption key to generate an encrypted one or more encryption keys to be communicated to the remote storage provider.

18. The one or more storage media as recited in claim 17, wherein the program instructions when executed further cause the one or more computing devices to implement the data transfer tool to:
    obtain the at least one encryption key from the remote storage provider separate from the plurality of shippable storage devices, or
    provide the at least one encryption key from the client site to the remote storage provider separate from the plurality of shippable storage devices.

19. The one or more storage media as recited in claim 14, wherein the program instructions when executed further cause the one or more computing devices to implement the data transfer tool to:
    obtain, from the remote storage provider, security information; and
    authenticate, based on the security information, one or more of the shippable storage devices.

20. The one or more storage media as recited in claim 14, wherein the program instructions when executed further cause the one or more computing devices to implement the data transfer tool to:
    encrypt the different shards using one or more encryption keys to generate a plurality of encrypted shards;
    determine a subset of the plurality of encrypted shards less than the plurality of encrypted shards for import into the storage provider based on a minimum number of shards required to reconstitute the identified data stored among the plurality of encrypted shards; and
    wherein to transfer the different shards to the different ones of the plurality of shippable storage devices, the program instructions when executed further cause the one or more computing devices to implement a data transfer tool to:

transfer different shards of the subset to the different ones of the plurality of shippable storage devices.

* * * * *